(12) United States Patent
Stackpole

(10) Patent No.: US 9,283,700 B2
(45) Date of Patent: Mar. 15, 2016

(54) REMOVABLE MAGNETIC LINER AND SCREENING MEDIA, AND PROCESSES OF PRODUCTION, INSTALLATION, AND USE THEREOF

(75) Inventor: Benjamin Stackpole, Gray, GA (US)

(73) Assignee: TEMA Isenmann, Inc., Cincinnati, OH (US)

( * ) Notice: Subject to any disclaimer, the term of this patent is extended or adjusted under 35 U.S.C. 154(b) by 441 days.

(21) Appl. No.: 12/819,674

(22) Filed: Jun. 21, 2010

(65) Prior Publication Data

US 2011/0151178 A1    Jun. 23, 2011

Related U.S. Application Data

(63) Continuation-in-part of application No. 12/646,304, filed on Dec. 23, 2009.

(51) Int. Cl.
| | |
|---|---|
| B32B 3/08 | (2006.01) |
| B32B 3/22 | (2006.01) |
| B29C 45/14 | (2006.01) |
| B07B 1/46 | (2006.01) |
| B29K 705/00 | (2006.01) |

(52) U.S. Cl.
CPC .............. B29C 45/14065 (2013.01); B07B 1/46 (2013.01); *B07B 2201/02* (2013.01); *B29K 2705/00* (2013.01); *Y10T 428/24008* (2015.01)

(58) Field of Classification Search
CPC .............. H01F 1/00; A47G 2001/0672; A47G 2001/00; A47G 2001/005; A47G 1/16; A47G 1/17

USPC .......... 428/156, 158–160, 172, 67, 161, 162, 428/163, 168, 187, 904.1, 908.8; 52/177, 52/181, 309.16; 51/295, 297

See application file for complete search history.

(56) References Cited

U.S. PATENT DOCUMENTS 2,720,311 A * 10/1955 Benjamin ..................... 209/334
3,020,562 A    2/1962 Reynolds
(Continued)

FOREIGN PATENT DOCUMENTS

| DE | 3628418 A1 | 2/1988 |
|---|---|---|
| WO | 00/32500 A1 | 6/2000 |
| WO | 2008/042844 A1 | 4/2008 |

OTHER PUBLICATIONS

International Searching Authority, The International Search Report and the Written Opinion of the International Searching Authority, or the Declaration, PCT/US2010/61497, Feb. 24, 2011, 12 pgs.

(Continued)

*Primary Examiner* — Aaron Austin
*Assistant Examiner* — Megha Gaitonde
(74) *Attorney, Agent, or Firm* — Wood, Herron & Evans, LLP

(57) ABSTRACT

A removable, magnetically-affixed mechanical wear element, preferably comprising ultra-high molecular weight polyethylene or polyurethane materials, is provided for affixation to a ferrous substrate material. The mechanical wear element is configured so that the magnetic attachment element is not easily removed or dislodged from the mechanical wear element, without regard to choice of mechanical wear element material utilized.

17 Claims, 16 Drawing Sheets

(56) References Cited

U.S. PATENT DOCUMENTS

| | | | |
|---|---|---|---|
| 3,034,140 A | 5/1962 | Reynolds | |
| 3,315,424 A * | 4/1967 | Smith | 52/206 |
| 3,378,974 A * | 4/1968 | Bush, Jr. | 52/506.05 |
| 3,407,530 A * | 10/1968 | Grant | A63H 33/046 |
| | | | 273/157 R |
| 3,546,709 A | 12/1970 | Cross | |
| 3,659,887 A | 5/1972 | Marquette | |
| 4,245,863 A | 1/1981 | Carter | |
| 4,529,660 A | 7/1985 | Heim | |
| 4,643,475 A | 2/1987 | Neumann | |
| 4,763,945 A | 8/1988 | Murray | |
| 4,847,582 A * | 7/1989 | Cardone et al. | 335/289 |
| 4,896,911 A | 1/1990 | Duke | |
| 4,909,559 A | 3/1990 | Zettle | |
| 4,986,590 A | 1/1991 | Patti et al. | |
| 4,997,227 A | 3/1991 | Falzone et al. | |
| 5,038,829 A | 8/1991 | Panella | |
| 5,045,184 A | 9/1991 | Arkles | |
| 5,050,925 A | 9/1991 | Brown | |
| 5,069,951 A | 12/1991 | Egan | |
| 5,275,460 A | 1/1994 | Kraus | |
| 5,312,145 A | 5/1994 | McNeil | |
| 5,320,392 A | 6/1994 | Hart | |
| 5,806,909 A | 9/1998 | Wise | |
| 6,027,057 A | 2/2000 | Miles | |
| 6,303,241 B1 | 10/2001 | Miles | |
| 6,468,678 B1 | 10/2002 | Dahlin et al. | |
| 6,619,717 B2 | 9/2003 | Gardiner | |
| 7,273,644 B2 | 9/2007 | Linker | |
| 7,344,032 B2 | 3/2008 | LaVeine et al. | |
| 2003/0138620 A1 | 7/2003 | Fonseca | |
| 2006/0042140 A1 * | 3/2006 | Frew | 40/729 |
| 2006/0201894 A1 | 9/2006 | Wood et al. | |

OTHER PUBLICATIONS

United States Patent and Trademark Office, Notice of and Reasons for Allowance and Fee(s) Due, U.S. Appl. No. 12/646,304, filed Jul. 27, 2012, 12 pgs.

European Patent Office, Supplementary European Search Report and Opinion, European Patent Application No. EP 10 84 0057, May 27, 2014, 9 pgs.

* cited by examiner

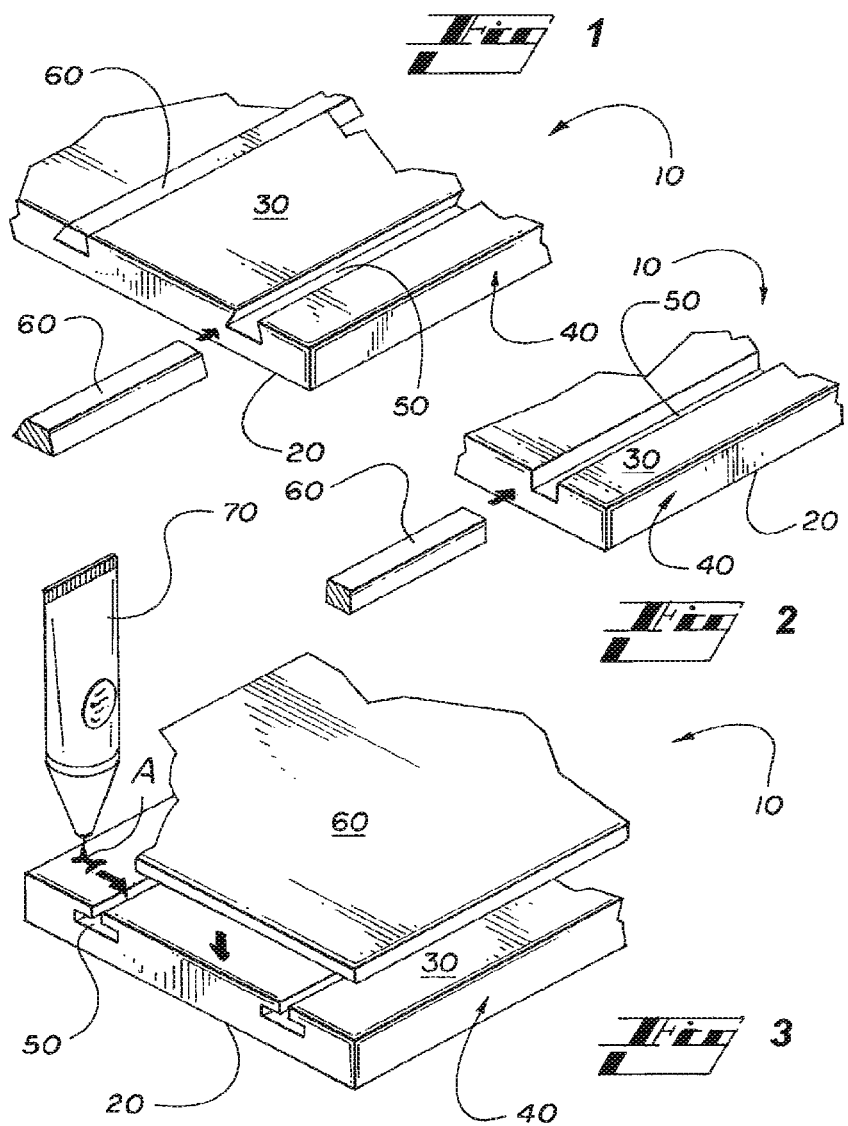

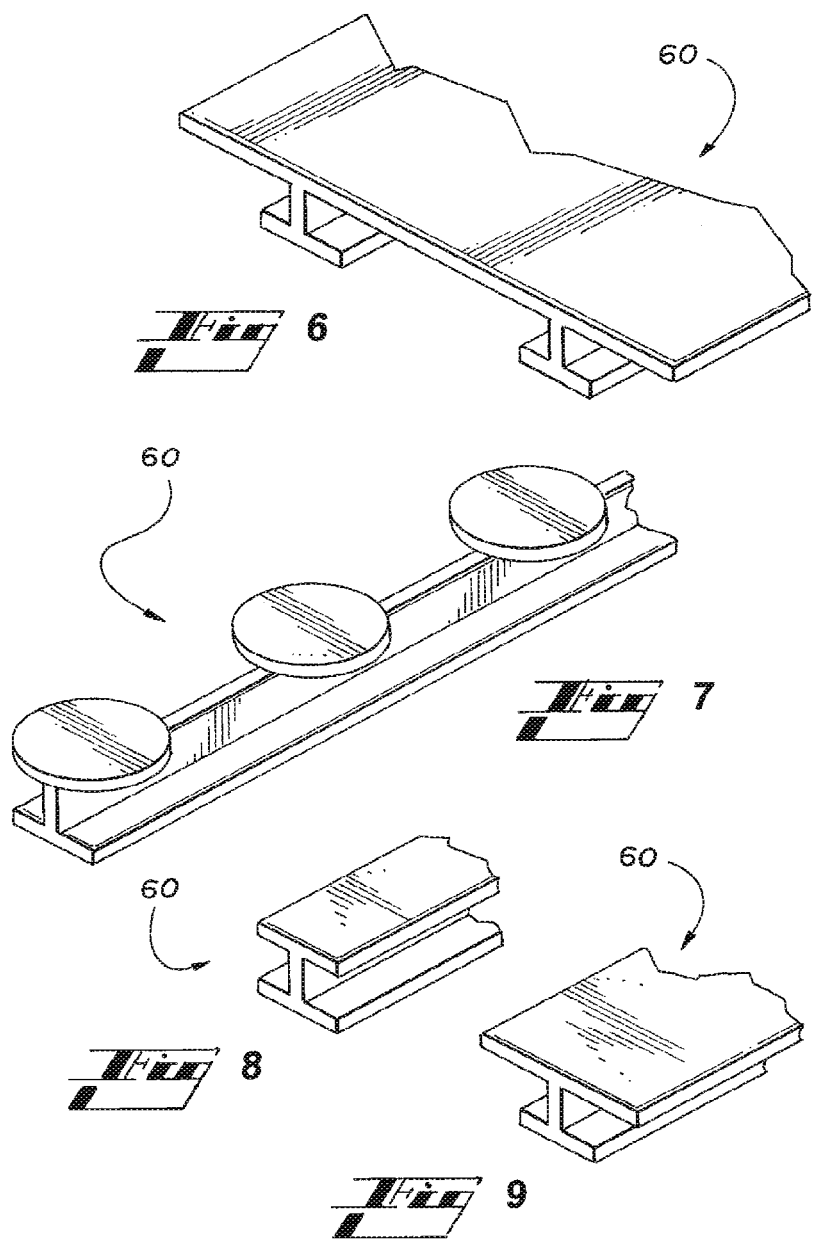

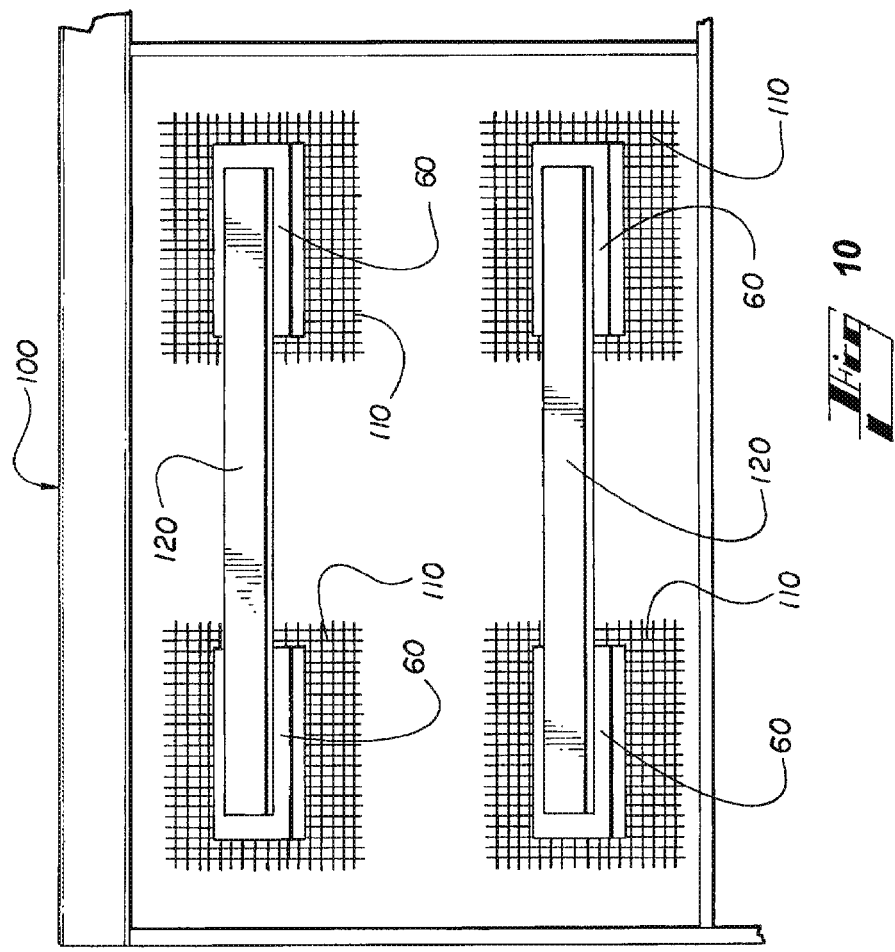

REMOVABLE MAGNETIC LINER AND SCREENING MEDIA, AND PROCESSES OF PRODUCTION, INSTALLATION, AND USE THEREOF

CROSS-REFERENCE TO RELATED APPLICATIONS

This application is a continuation-in-part of, and claims priority to, U.S. non-provisional patent application Ser. No. 12/646,304, filed on Dec. 23, 2009, entitled "Removable Magnetic Liner and Processes of Production, Installation, and Use Thereof," which is herein incorporated by reference in its entirety.

TECHNICAL FIELD

The present invention relates, generally, to mechanical wear elements, such as liner and mechanical screening products, and to related processes for production and use thereof; and, more particularly, to mechanical wear elements, such as removable liners and mechanical screens principally finding use within sorting, sifting, and sizing applications, attachable to a structure via magnetic means and comprising ultra-high molecular weight polyethylene (UHMWPE) or polyurethane materials, and to methods of production, installation, and use thereof.

BACKGROUND OF THE INVENTION

I. Liners

The subject matter of the present disclosure is applicable to a classification of products known in the relevant industry as "liners." Conventional liners are coverings used to protect a surface from wear, corrosive materials, adhering materials, or the like. Such liners can be used in any of a variety of commercial, industrial, and residential applications. Examples may include lining various material handling or transportation equipment surfaces, such as vehicle beds and tanks; railroad car beds and tanks; decks; construction equipment, such as buckets, conveyors, scrapers, or the like; mining equipment, such as screening media, lip liners, tube covers, side rails, and chute liners; farm equipment; or the like; or lining various bulk material storage areas, such as silos, chutes, bins, storage tanks, or the like.

Such liners most typically take one of two primary forms: (1) mechanically affixed liners and (2) spray-on or dip-applied coating liners. Consistent with the above-described purposes, mechanically affixed liners are often made of metal, plastic, wood, fiberglass, ultra-high molecular weight polyethylene material, and/or other like materials. Most often, such liners are permanently affixed to the substrate material or underlying product through attachment means such as adhesive(s), nails, screws, bolts and nuts, staples, mechanical cleats, magnetic means, or the like. Alternatively, it is common in the industry to apply a semi-permanent or permanent spray-on or dip-applied coating to a base material, in order to obtain a liner with advantageous properties.

For example, commercial liners for bulk storage uses may sometimes involve application of a permanent or semi-permanent, spray-on or dip-applied coating. Some such coatings are surface coatings only; some may chemically bond to the substrate material. Illustratively, in commercial mixers, the liner may be applied to the mixing tank surface; and in storage tank vessels, the liner may be applied to the tank walls. Advantageously, such liners tend to be relatively thin, lightweight, and cost effective to apply. The benefits of such liners to the end-user may include reduced-sticking of a contained material, and easier or more effective cleaning of the container, both of which may further result in a higher yield of the contained or stored product, a more cost effective process, and/or a cleaner or more sanitary process.

Disadvantageously, however, after a period of time, whether soon after heavy use, or after a few years of prolonged use, the spray-on type liner often begins to corrode, chip, spall, or peel away. The only viable solution is to remove and reapply the coating, resulting in downtime and additional expense to the user.

On the other hand, there exist various mechanically affixed liners, and, depending upon the materials used, and upon the intended application, these liners may provide benefits such as resistance to impact (including dent and scratch resistance), and resistance to puncture, corrosion, weather, ultraviolet light, ozone, biocontaminants (such as algae), chemicals, thermal extremes, or the like. Whether alternatively or in conjunction with the above-described benefits, such liners may further provide beneficial characteristics including impermeability, low or high surface friction, elasticity, rigidity, hardness, water tightness, and greater load bearing capacities, strength, toughness, and durability. Accordingly, such liners are often used in bulk storage areas in order to take advantage of one or more of the aforementioned beneficial characteristics, such as ease of cleaning, impermeability, corrosion resistance, impact resistance, and strength.

Presently emerging in the industry are thoughts of using ultra-high molecular weight polyethylene materials and polyurethane materials in liners, due to certain desirable characteristics, including low permeability, high durability and impact resistance, and, depending upon the material and formulation, low or high surface friction characteristics. For example, ultra-high molecular weight polyethylene material exhibits low frictional characteristics and is, therefore, desirable for use in applications requiring a slick, non-stick surface. Polyurethane materials exhibit high durability and resistance, and desirable moldability and shaping characteristics.

Thus, while beneficial and useful characteristics in certain important applications, these very same characteristics create a challenge for use as a removable liner. Specifically, UHMWPE material cannot easily be used as a removable liner. This is because UHMWPE material cannot be conveniently attached to a substrate without damage to the underlying substrate and to the liner, in large part due the physical properties of UHMWPE material. Specifically, and as discussed above, UHMWPE material is a low friction material and, therefore, adhesives will not adhere. Furthermore, thermal welding is difficult/impractical with the current state of manufacturing process technology. Likely for these reasons, there are no known easily removable liners utilizing UHMWPE material.

Specifically, available processes require mechanical attachment to the underlying substrate, often requiring modification of, or permanent structural change to, both the substrate and liner. For example, in the prior art, it is known to use brackets, cleats, and "nuts and bolts" to attach a liner sheet to a substrate material. Specifically, the prior art discloses the use of a protective liner retainer in combination with a panel attachment member to secure the retainer to a cargo panel of a cargo bed or other material handling bin, a liner attachment member with cleats for securing a protective liner to the retainer, and a support member for attaching the liner attachment member to the panel attachment member and for defining the thickness of liner that may be secured by the retainer by separating the panel attachment member and the liner attachment member. It is also contemplated in the prior art to attach brackets to the storage area via magnetizing with continuous use of cleats. However, no specific teaching is made for a removable liner that is bracket and cleat free.

It is apparent in the prior art that use of UHMWPE material as a liner for bulk storage requires substantial modification to the substrate material in order to use. Specifically, to attach the UHMWPE material, the present options in the prior art include drilling of holes, tapping of holes, addition of mechanical elements (such as brackets, cleats, screws, nuts and bolts, and the like) to the substrate material. As a result, the UHMWPE liners are not easily removable, and mere installation results in damage to the liner and/or the substrate. Furthermore, problems with use of the aforementioned connection means includes, corrosion, stress cracks, breakage, catching of stored materials, difficulty in cleaning, cross-contamination of contained product, and the like.

In sum, then, liners in the prior art require an extensive amount of effort to install and remove. Also, due to the means of attachment, damage to the substrate material may occur. This damage includes initial modification of the substrate surface to provide attachment points, with attendant scratching, gouging, holes, rusting, cracking, water penetration and damage, contained product seepage, contamination, drawdown, or the like.

Further disadvantageously, such liners in the prior art are prone to frequent replacement issues. Specifically, when the liners are installed using conventional nut and bolt attachment means, or the like, the liner material experiences an increased level of stress in focused portions of the UHMWPE material, which may result in stress cracking Therefore, there is increased risk that the user will have to constantly replace the liner, resulting in additional and unnecessary costs to the user.

II. Mechanical Screens

The subject matter of the present disclosure is also applicable to a classification of products known in the relevant industry as "mechanical screens" or "screens," and these terms will be used interchangeably herein. Mechanical screens are typically utilized in an automated or semi-automated process called "mechanical screening" or "screening," and, again, these terms will be used interchangeably herein. Screens, and associated screening processes, are utilized in a variety of industries, such as, for example, mining, road building, construction, mineral processing, agriculture, pharmaceuticals, food processing, plastics, metal processing, waste separation, and recycling, to name but a few, wherein the screens principally find use within sorting, sifting, and sizing applications.

For purposes of the instant disclosure, mechanical screening may be thought of as a sieving process of an industrial magnitude. Sieving is a technique by which particulates or granules of different sizes may be separated into a "grade" of material defined by particle size. A sieve typically comprises a peripheral frame, within which is affixed or formed a screen or mesh having openings of a desired size and shape, or a plurality of desired sizes and shapes, sufficient to separate either wet or dry particulate or granular materials of a specific size from a material having a distribution of particle sizes. In the relevant industry, this type of sieve device is most often known as a "screen," and so the terms "screen" or "mechanical screen" will, again, be understood to encompass any sieve or sieve-like device.

Thus, a small sieve might have very small openings which allow only very fine particles to pass through. Coarse particles are retained in the sieve, or are broken up by grinding against the screen openings, or are separated for storage or subsequent processing. Depending upon the types and/or nature of particles or granules to be separated, sieves with different types, sizes, shapes, or other opening characteristics are used. Most often, a plurality of sieves are utilized in sequential, often stacked-in-parallel arrangement, through which a material with a distribution of particle sizes may be passed, the particle sizes being separated from largest to smallest, whereafter particles of a defined size may be conveyed to a post-separation grinder, crusher, mill, hammer, or the like, to further reduce the particle size (often subsequently to be redirected through a secondary screening process); to a storage area; to an intermediary finishing process; or, to a finished product.

Most often, screening machines comprises a drive mechanism that both transports bulk material to the screens and induces motion and/or vibration in order to assist the screening process. The material is received by one or more screens which, most often, rest upon, or within, either a horizontal or inclined decking structure. The screens may be organized in sequential arrangement or, more typically for space-savings and material handling efficiencies, are provided in an inclined, stacked-in-parallel (multi-deck) arrangement.

Screening processes may fail or may be otherwise impeded by a variety of conditions which affect the screen or screens during use and operation. For example, plugging, wear, blinding, breakage or tearing, foreign body contamination, fines or oversize particle contamination, dampening, and/or a variety of other conditions may arise which degrade the screens and, thereby, the screening process. In such circumstances, the affected screen or screens must be repaired, replaced, maintained, and/or otherwise manipulated, in order to remedy the deleterious condition. Such remediation nearly always requires human intervention through hands-on maintenance, restoration, repair, and/or other mitigation of the problematic condition.

Notwithstanding, in many currently available machine designs, it is exceedingly difficult to access the screens for such maintenance-related activities. Even when access is achieved, current means of affixation and/or capture of the screens into the machine deck structure requires the use of wrenches, crowbars, hammers, or the like, in order to dislodge, reinstall, or otherwise maintain the problematic screen or screens. Given that most screening machines have exceedingly small clearance spaces between machine components and/or decks (often <70 cm), access to the screens and support decks, and the use of tools thereupon, is often exceedingly difficult. Further compounding the problematic nature of such maintenance-related activities is that such areas are potentially unsafe, due to the risk of falling materials, with a potential for particulate-related injuries to the eyes or respiratory system, and the risk of impact related injuries to head, neck, shoulders, back, or the like.

Additionally, it will be recognized that there exist many different types, styles, and manufacturers of screening machines, and of the screens utilized therewith. Accordingly, there remains a need for interchangeability and standardization of mechanical screens and their attendant mounting systems utilized in such machines, with concordant flexibility, ease of use, and ease of maintenance thereof. In view of the above discussion, such an improved system may increase workplace safety and reduce the number and/or nature of injuries. Such an improved system may result in cost-effective screen replacement and maintenance processes, including attendant labor savings.

In order to be effective, however, such a system should require no significant changes with regard to tried and true screen materials, and should require no significant redesign of the screens or of the machines that utilize them. Such a system would provide screens that are scaleable in size and/or design, and that would be effective in use and operation, with relatively few modifications or changes to either the basic screen or deck design.

In view of the above discussions with regard to liners and mechanical screens, then, it is apparent that industrially-viable, easily removable mechanical wear elements, such as those preferably taking the form of the aforementioned liner and/or mechanical screening products, have not been contemplated in the prior art, especially with regard to the use of UHMWPE and polyurethane materials, which can be applied to a substrate material without modification of the substrate material. Due to the widespread use of ferrous metals within industrial substrates, there is now presented an opportunity to develop a mechanical wear element having novel means of attachment, while taking advantage of certain desirable, inherent properties of the selected mechanical wear element materials, in order to provide a mechanical wear element that is easily manufactured, easily applied, easily used, easily removed, and easily replaced; all without requiring deleterious modification of the substrate material and, thereby, avoiding or obviating the above-discussed attendant disadvantages of such deleterious attachment methods.

Therefore, what is needed in order to address the above-noted disadvantages and opportunities, but which has not heretofore been available, are novel, removable, magnetically-affixed mechanical wear elements, such as those taking the form of liners and screens, comprising ultra-high molecular weight polyethylene or polyurethane materials, and related processes for producing, installing, and using said magnetic, removable mechanical wear elements. The mechanical wear element of the present invention are preferably configured so that the magnetic attachment means are not easily removed or dislodged from the mechanical wear elements, regardless of liner or screen material choice. It is to such desirable ends that the following developments in the state of the art are presented.

BRIEF SUMMARY OF THE INVENTION

Briefly described, in a preferred embodiment, the apparatus and process of the present invention overcome the above-mentioned disadvantages, and meet the recognized needs, by providing a mechanical wear element taking exemplary forms of (i) a removable magnetic liner and (ii) a removable magnetic mechanical screen, and associated methods for production, installation, and use of such mechanical wear element.

For purposes of the disclosures presented hereinbelow, the term, mechanical wear element, then, is intended to define any of a variety of mechanical liner elements, mechanical screen elements, and/or the like. Accordingly, the term, mechanical wear element, shall be used interchangeably herein to identify any such mechanical liner element, mechanical screen element, and/or the like, as is known in the art.

For purposes of the disclosures presented hereinbelow, the term, magnetic element, and the plural forms thereof, is intended to define and designate (i) any magnet of permanent or electromagnetic form and/or (ii) any ferrous material to which a magnet of the aforementioned types may be attracted and/or attached. Thus, it will be recognized by those of ordinary skill in the art while considering the disclosures made hereinbelow that, depending upon use and application of the subject matter hereof, a magnet may be placed within a mechanical wear element for affixation to a ferrous material surface, or, alternatively, a ferrous material may be placed within a mechanical wear element for affixation to a magnetized surface, or combinations thereof. Accordingly, the term, magnetic element, is intended to contemplate use of either a magnet or a ferrous material, as the intended use and application shall require, for cooperative attachment and/or affixation of magnet or ferrous material to the corresponding other.

According to its major aspects, and broadly stated, an exemplary apparatus, and a process according to the present invention, provides a removable magnetic mechanical wear element, preferably comprising an ultra-high molecular weight polyethylene (UHMWPE) or polyurethane material. In an embodiment specifically advantageous for use with UHMWPE materials, one or more slot or groove is formed into the UHMWPE material. The slot or groove is preferably shaped to preclude or reduce tensile or shearing-type withdrawal of a contained element from said slot or groove. Disposed within said slot or groove, a contained element may comprise an adhesive, the adhesive filling, or partially filling, said slot or groove, and further bonded to a magnetic element disposed within, or overlying, said slot or groove. In such regard, the mechanical wear element material may be heated at various stages to facilitate either, or both, forming the slot or groove and/or pressing the magnetic element into place.

The magnetic element may comprise any of a variety of shapes or forms, depending upon the desired magnetic strength, function, and intended application. Further alternatively, a combination of such magnetic attachment means may be utilized. Also disclosed are processes of production, installation, and use thereof.

In an alternative mechanical wear element embodiment, best illustrated with polyurethane materials, a magnetic attachment means is molded or cast into the polyurethane material. Accordingly, disclosed are processes of production, installation, and use thereof.

Thus, one aspect of the present subject matter disclosure is to provide a removable magnetic mechanical wear element that comprises UHMWPE material having a slot or groove formed therein and magnetic elements disposed therein or associated therewith.

Another aspect of the present subject matter disclosure is to provide a removable magnetic mechanical wear element that comprises adhesive material disposed, and subsequently cured, within a slot or groove formed into the UHMWPE material, and a magnetic element bonded to said adhesive and covering at least a portion of said UHMWPE material.

Yet another aspect of the present subject matter disclosure is to provide a mechanical wear element embodiment, best utilized with polyurethane materials, wherein a magnetic attachment means is molded or cast into the polyurethane material.

Other useful considerations attendant the present subject matter disclosure include: configuration of the mechanical wear element such that the magnetic element is not easily removed or dislodged from the mechanical wear element, regardless of mechanical wear element material choice; provision of a mechanical wear element that is easy to install and easy to remove; provision of a mechanical wear element that protects the underlying substrate, rather than requiring deleterious modification of the substrate for attachment of the mechanical wear element; provision of a mechanical wear element that is less prone to excessive wear and tear; provision of a mechanical wear element that is less prone to stress cracks; provision of a mechanical wear element that is not easily dislodged from desired application of use, and not easily degraded by scuffing, scratching, weathering, and/or other deleterious effects over time.

These and other aspects of the apparatus and process of the present invention will become apparent to those ordinarily skilled in the art after reading the following Detailed Description of the Invention and Claims in light of the accompanying drawing Figures.

BRIEF DESCRIPTION OF THE DRAWINGS

The following specification is best read in conjunction with the accompanying drawing Figures, in which like reference numbers throughout the various drawing Figures designate like structure, and in which:

FIG. 1 is a perspective cut-away view of a first mechanical wear element embodiment made in accordance with the present disclosure;

FIG. 2 is a perspective cut-away view of a second mechanical wear element embodiment made in accordance with the present disclosure;

FIG. 3 is a perspective cut-away view of a third mechanical wear element embodiment made in accordance with the present disclosure;

FIG. 6 is a perspective cut-away view of one form of magnetic element made in accordance with the present disclosure;

FIG. 7 is a perspective cut-away view of another form of magnetic element made in accordance with the present disclosure;

FIG. 8 is a perspective cut-away view of another form of magnetic element made in accordance with the present disclosure;

FIG. 9 is a perspective cut-away view of another form of magnetic element made in accordance with the present disclosure;

FIG. 10 is a perspective view of an alternate method of producing a mechanical wear element embodiment made in accordance with the present disclosure;

Figure 4:
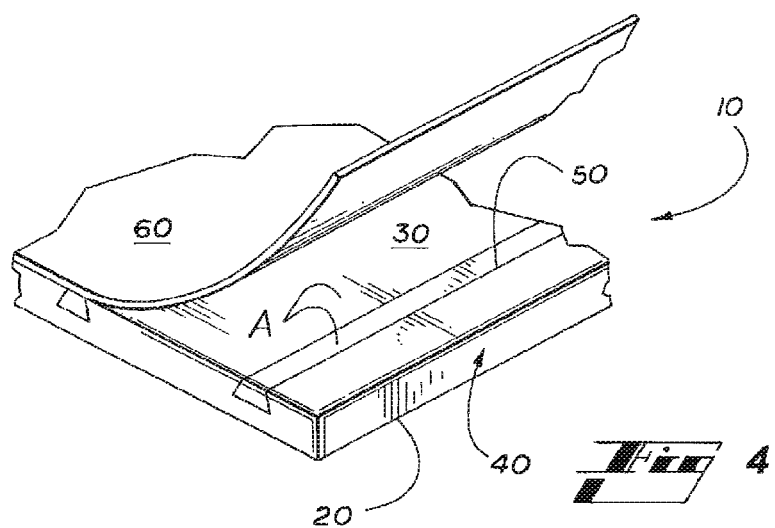
FIG. 4 is a perspective cut-away view of a step in producing a fourth mechanical wear element embodiment made in accordance with the present disclosure.

It is to be noted that the drawing Figures presented are intended solely for the purpose of illustration and that they are, therefore, neither desired nor intended to limit the subject matter of the claimed invention to any or all of the exact details of construction shown, except insofar as they may be deemed essential to the claimed invention.

DETAILED DESCRIPTION OF ILLUSTRATIVE EMBODIMENTS

In describing preferred embodiments of the subject matter of the present subject matter, as illustrated in the drawing Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Referring now more particularly to the drawing Figures, and to that embodiment of the invention here presented by way of illustration, FIG. 1 portrays a device made in accordance with the subject matter of the present disclosure. As shown in FIG. 1, mechanical wear element 10 preferably comprises ultra-high molecular weight polyethylene (UHMWPE) sheeting of user-selected grade, and of minimum thickness sufficient to accommodate the details of construction set forth hereinbelow. Mechanical wear element 10 has first side 20 and second side 30, comprising preferably flat, planar surfaces other than defined by edges 40 in a dimension of thickness.

In this example, first side 20 is intended to be the outward, working mechanical wear element surface; that is, the side not facing a substrate material to which mechanical wear element 10 will be attached. Conversely, in this example, second side 30 is the side that will be attached to a ferrous metal substrate.

Such substrates may take the exemplary forms of material handling, mechanical screening, or transportation equipment surfaces, such as vehicle beds and tanks, railroad car beds and tanks, decks, construction equipment, farm equipment, or the like; or lining various bulk material storage areas, such as silos, chutes, bins, storage tanks, or the like. In this regard, UHMWPE is a preferred mechanical wear element material due to its advantageous properties or characteristics, such as, by way of non-limiting example, low permeability, high durability and impact resistance, and low surface friction.

Because of the relative low friction characteristics of UHMWPE, wherein adhesives will not effectively adhere, however, means for affixing a magnetic element of sufficient strength to firmly, but removably, attach mechanical wear element 10 to a ferrous substrate were developed, as more fully described and set forth hereinbelow.

Accordingly, in the embodiment of mechanical wear element 10 shown in FIG. 1, one or more slot or groove 50 is machined or otherwise formed into surface 30. For purposes of this disclosure, a groove is defined as a longitudinal channel, preferably of less than full material depth, formed within surface 30; and a slot is defined as a truncated or shortened groove. For purposes of the remaining disclosures hereinbelow, the term, groove, will be utilized; however, it will be recognized by those of ordinary skill in the art that a slot, or a series of slots, could be substituted for a groove without departing from the scope or spirit of this disclosure.

Groove 50 is preferably shaped to preclude or reduce tensile or shearing-type withdrawal of a contained element from said slot or groove. Thus, as best seen with continuing reference to FIG. 1, groove 50 may be formed in a truncated triangular cross-section, best described when extended along the planar surface as a dovetail-shaped groove. A dovetail groove is desirable for use in association with the present subject matter due to its resistance to being pulled apart (i.e., tensile strength) from a complementary shaped element disposed therein.

Groove 50 is sized to accommodate magnetic element 60. Magnetic element 60 may be, for example, any of a variety of formulations taking the shape, in this instance, of a bar magnet. Magnetic element 60 is formed, by machining or the like, to take a complementary shape for insertion into groove 50, as by sliding longitudinally thereinto.

It is here noted that, in order to achieve adequate workability of mechanical wear element 10 for insertion of magnetic element 60 into groove 50, the temperature of the UHMWPE material may be elevated. For example, it has been found that a material temperature of approximately 100 degrees Fahrenheit provides sufficient workability to construct mechanical wear element 10 as described hereinabove. Similarly, the temperature of magnetic element 60 may be elevated, for example, to a temperature of approximately 150 degrees Fahrenheit, to assist the assembly process.

In this manner, useful mechanical wear element 10 is accordingly relatively simply formed from a material, UHMWPE, which is otherwise not suitable for the intended purposes as a mechanical wear element. Mechanical wear element 10, so formed, may be placed upon a ferrous substrate, with side 30 disposed against the ferrous substrate. The relative attachment strength between mechanical wear element 10 and its ferrous substrate may be adjusted by designing mechanical wear element 10 with a sufficient number of groove and magnetic elements per square unit length (e.g., inch, yard, centimeter, meter, or the like) to achieve the desired holding strength. Alternatively, or additionally, magnetic elements 60 may be designed to provide stronger or weaker magnetic density. With this construction, mechanical wear element 10 advantageously may be easily fitted into a required location and position, with that location and position being changeable by a user lifting or prying mechanical wear element 10 from its position and repositioning it as desired. Removal is similarly simple, through the user's action in lifting or prying mechanical wear element 10 away from the surface of the ferrous substrate.

Moving now to FIG. 2, an alternative embodiment of mechanical wear element 10 is shown. In this embodiment, mechanical wear element 10, and each enumerated element thereof, takes equivalent structure, form, and function as described above with regard to the embodiment of FIG. 1, except insofar as detailed below. In this embodiment, groove 50 takes the form of a rectangular groove, and magnetic element 60 takes the form of a rectangular bar-type magnet. In this embodiment, however, in order to achieve sufficient tensile strength, groove 50 is preferably slightly undersized as compared to the size of magnetic element 60, such that a "press-fit" is obtained in the assemblage. As detailed above, an elevated UHMWPE working temperature, sufficient for material plasticity, but less than would be required to exceed the material yield strength, may be helpful in achieving a correct fit between the parts. As further detailed above, the temperature of magnetic element 60 may also, or alternatively, be increased for such purposes.

Moving now to FIG. 3, an alternative embodiment of mechanical wear element 10 is shown. In this embodiment, mechanical wear element 10, and each enumerated element thereof, takes equivalent structure, form, and function as described above with regard to the embodiment of FIG. 1, except insofar as detailed below. In this embodiment, groove 50 takes the form of a groove of T-shaped cross-section, and magnetic element 60 takes the form of a sheet-type magnet. In this embodiment, however, an adhesive compound, adhesive A, is dispensed from container 70 and onto surface 30. In order to achieve sufficient tensile strength with magnetic element 60, however, groove 50 is preferably utilized to capture an excess of adhesive A, such that groove 50 is filled in excess of its capacity; to wit, above surface 30. Alternatively, it will be recognized by those of ordinary skill in the art that groove 50 may be entirely filled through its length, or spaced-apart sections thereof may be filled.

Adhesive A is further spread across either the entirety of surface 30, or across selected area(s) thereof, in sufficient quantity and thickness as may be desirable for the intended purposes described herein. Magnetic element 60 is thereafter pressed downwardly onto surface 30, either as a full sheet, or in sections, or in continuous downwardly flexing motion, whereafter air bubbles may be smoothed from underneath, as is known to do in the art.

Believed to be unique in this field and for these purposes, when adhesive A cures, it takes the form of groove 50. Thus, for the exemplary UHMWPE material discussed hereinabove, even though adhesive A will not likely bond in sufficient strength to surface 30 to form an effective bond with magnetic element 60, it will sufficiently bond directly to magnetic element 60. Thus, when adhesive A cures, magnetic element 60 is accordingly bonded to adhesive A, which is, in turn, captured firmly within groove 50.

Figure 5:
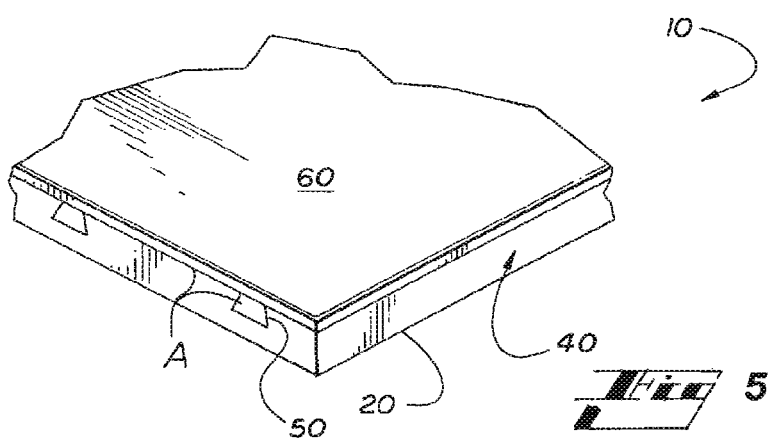
FIG. 5 is a perspective cut-away view of a step in producing a mechanical wear element embodiment of FIG. 4, made in accordance with the present disclosure.

Turning now to FIG. 4, an alternative embodiment of mechanical wear element 10 is shown. In this embodiment, mechanical wear element 10, and each enumerated element thereof, takes equivalent structure, form, and function as described above with regard to the embodiment of FIG. 1, except insofar as detailed below. In this embodiment, groove 50 takes the form of a groove of dovetail cross-section, and magnetic element 60 takes the form of a sheet-type magnet. The embodiment of FIG. 4, accordingly, visually demonstrates formation of mechanical wear element 10 according to the process described hereinabove with regard to the embodiment of FIG. 3. In turn, FIG. 5 depicts a finished mechanical wear element 10 produced according to the process of the embodiment described hereinabove with reference to FIGS. 3 and 4.

The reader now having the benefit of, and understanding provided by, descriptions for producing the mechanical wear element embodiments shown in FIGS. 1 through 3, we turn to FIGS. 6-9, wherein are shown alternative embodiments of magnetic element 60. FIG. 6 depicts magnetic element 60 formed, for example, by extrusion process, as a magnetic sheet preferably integrally formed with one or more T-shaped element for insertion into a mating T-shaped groove (see, e.g., FIG. 3) of mechanical wear element 10.

Similarly, FIG. 7 depicts an alternative embodiment of magnetic element 60 formed with one or more spaced-apart "button"-type magnets disposed upon one or more T-shaped element for insertion into a mating T-shaped groove (see, e.g., FIG. 3) of mechanical wear element 10. Such an embodiment may be useful in applications where spot affixation of mechanical wear element 10 is more appropriate than the construction forms provided by the embodiments of FIGS. 1-3.

Likewise, FIG. 8 depicts an alternative embodiment of magnetic element 60 formed in a "rail" or I-beam type construction. Such an embodiment conveniently may be formed, for example, by an extrusion process or the like. In this embodiment, one T-shaped end is enabled for insertion into a mating T-shaped groove (see, e.g., FIG. 3) of mechanical wear element 10.

As in FIG. 8, FIG. 9 depicts an alternative embodiment of magnetic element 60 formed in a different "rail"-type construction. Such an embodiment conveniently may be formed, for example, by an extrusion process or the like. In this embodiment, one T-shaped end is enabled for insertion into a mating T-shaped groove (see, e.g., FIG. 3) of mechanical wear element 10, whereas the broader T-shaped end, is more sheet-like for attachment via greater magnetic surface area onto the ferrous substrate.

Although the embodiments of magnetic element 60 shown in FIGS. 6-9 are depicted as being of integral construction, it will be understood that any such embodiment may be formed of separate portions and joined together in any manner known in the joining arts. Additionally, it will be recognized that surfaces of magnetic elements 60 intended to attach to the ferrous substrate may be magnetic, whereas the portions intended to attach to mechanical wear element 10 may be of any material, magnetic or otherwise.

Yet additionally, although depicted in FIGS. 6-9 as having T-shaped portions intended to attach to mechanical wear element 10, such portions of magnetic elements 60 may be of any shape disposed for mating with mechanical wear element 10 in any manner hereinabove described, or in any manner otherwise within the scope and spirit of the disclosure hereof. In that regard, such attachment portions may be dovetail shaped, T-shaped, rectangularly shaped, or otherwise, so long as sufficient for the purposes and applications described hereinabove. Conversely, the form and nature of groove 50 may be selected by the user in order to accommodate the nature of the magnetic element selected for use in the intended mechanical wear element application.

Figure 11:
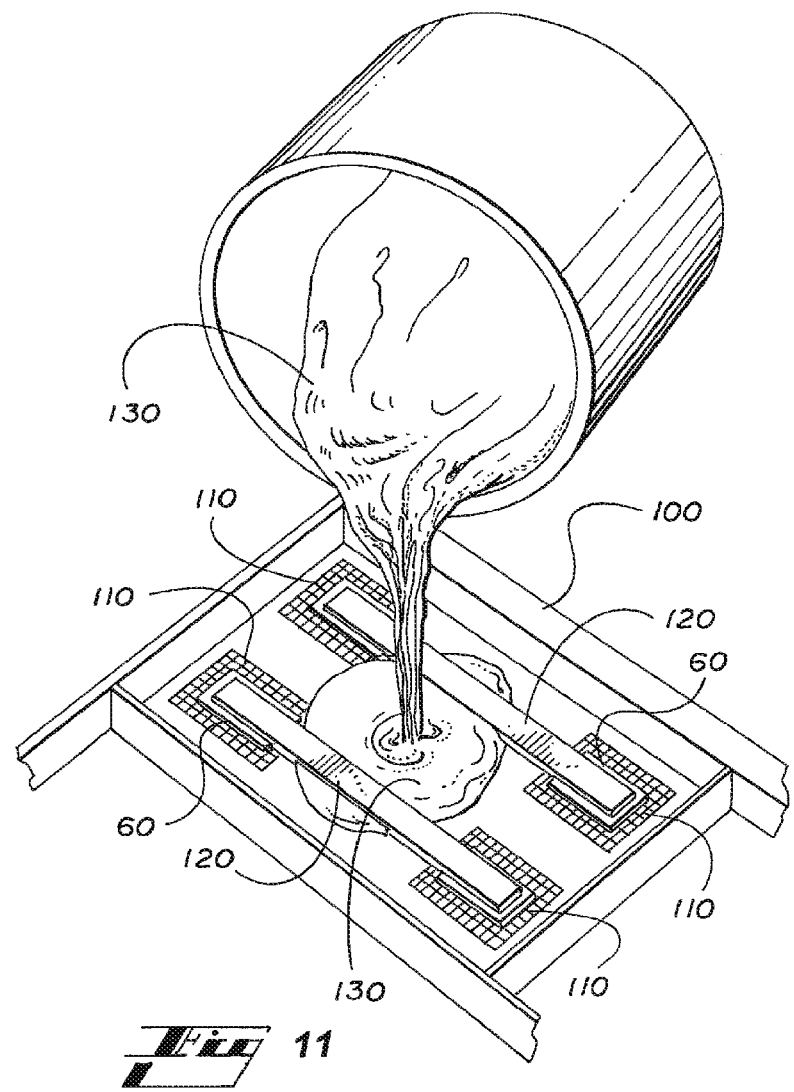
FIG. 11 is a perspective view of a further step in producing the mechanical wear element embodiment of FIG. 10, made in accordance with the present disclosure.
Figure 12:
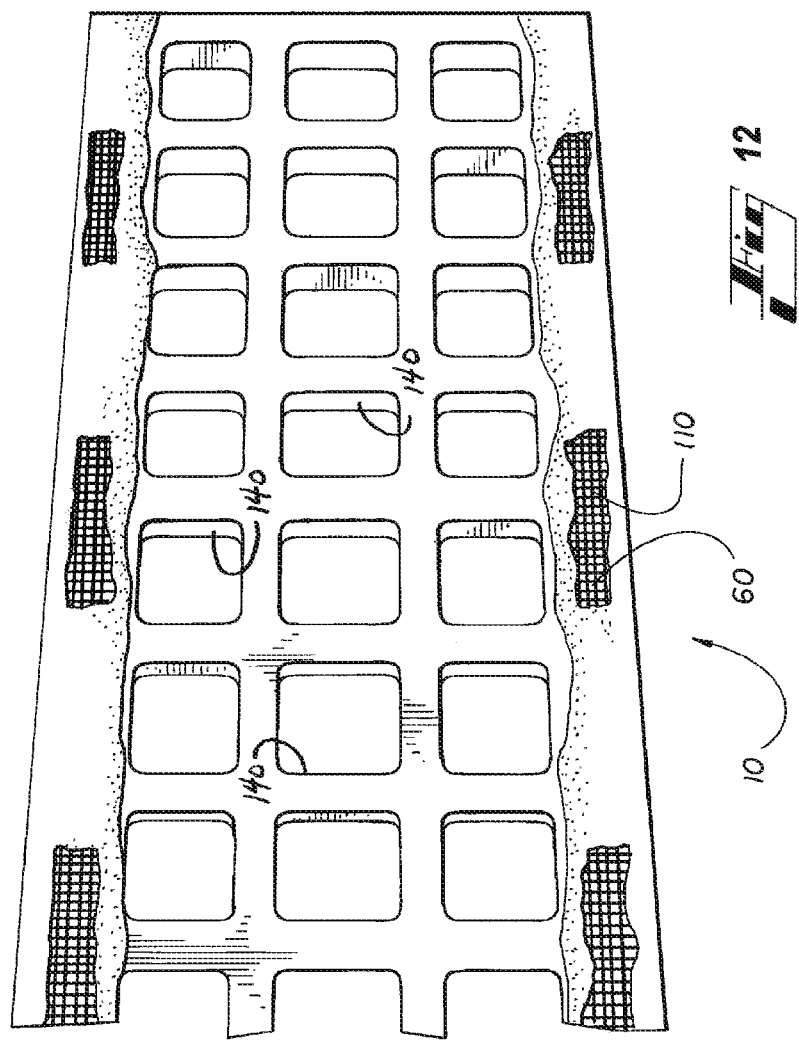
FIG. 12 is a perspective view of another form of mechanical wear element produced in accordance with the alternate method of FIGS. 10 and 11.

Turning now to FIGS. 10-12, an alternative method of construction of mechanical wear element 10 is shown. In this example, however, mechanical wear element 10 is preferably formed of polyurethane material. Such material may be selected for ease of molding, casting, or otherwise forming into a desired shape and form, and for use in applications conducive to the well-known desirable properties and characteristics of this material. For example, as set forth hereinabove, an especially useful application is found with reference to mechanical screens principally for sorting, sifting, and sizing applications used in mining, mineral processing, construction, road material, agricultural, pharmaceutical, food, plastics, and recycling industries, to name but a few. Such mechanical screens are most often used in processes intended to separate, sift, size, and/or sort one or more material according to physical characteristic such as size and/or shape.

As depicted in FIG. 10, mold 100 is assembled or otherwise provided. Into mold 100 are preferably placed one or more reinforcing, woven or non-woven, mesh material 110, of sufficient number and size for the intended application. Placed upon mesh material 110 are one or more magnetic elements 60, shown as rectangular, bar-type magnets. For suitable applications, one or more ferrous band 120 is placed atop, and bridging, selected magnetic elements 60. Ferrous band 120, typically steel, is so placed in order to interlink magnetic elements 60 and, thereby, spread the magnetic flux. It will be apparent to those of ordinary skill in the art that mesh material 110 may be omitted in those circumstances wherein reinforcement of the magnetic elements and/or mechanical wear element surface is not required to meet the intended application.

Turning now to FIG. 11, a further process step is demonstrated. In this step, liquid (emulsified) polyurethane material 130, of user selected formulation sufficient for the intended application, is poured or injected into mold 100. When mold 100 is filled to sufficient depth, the loaded mold is set aside to cure. Curing may occur according to any known process effective for the polyurethane material utilized, whether in elevated temperature environs, or otherwise. When the polyurethane material is sufficiently cured, mechanical wear element 10 is demolded and is thereafter available for an intended use.

Although mechanical wear element embodiments depicted within FIGS. 1-11 have been illustrated as flat, planar sheet-like mechanical wear elements, it will be apparent to those of ordinary skill in the art that other mechanical wear element forms and structures may be formed commensurate with the disclosures made herein. Accordingly, and for merely illustrative purposes, FIG. 12 depicts an alternative embodiment of mechanical wear element 10 not in continuous sheet-like form. In FIG. 12, and formed by the process described hereinabove with regard to FIGS. 10-11, mechanical wear element 10 is depicted as an open lattice structure, wherein, for example, material weight may be spared, airflow increased, sorting and/or screening capabilities provided, or the like. Such embodiments are limited only by the imagination and ingenuity of the mechanical wear element designer.

Figure 13:
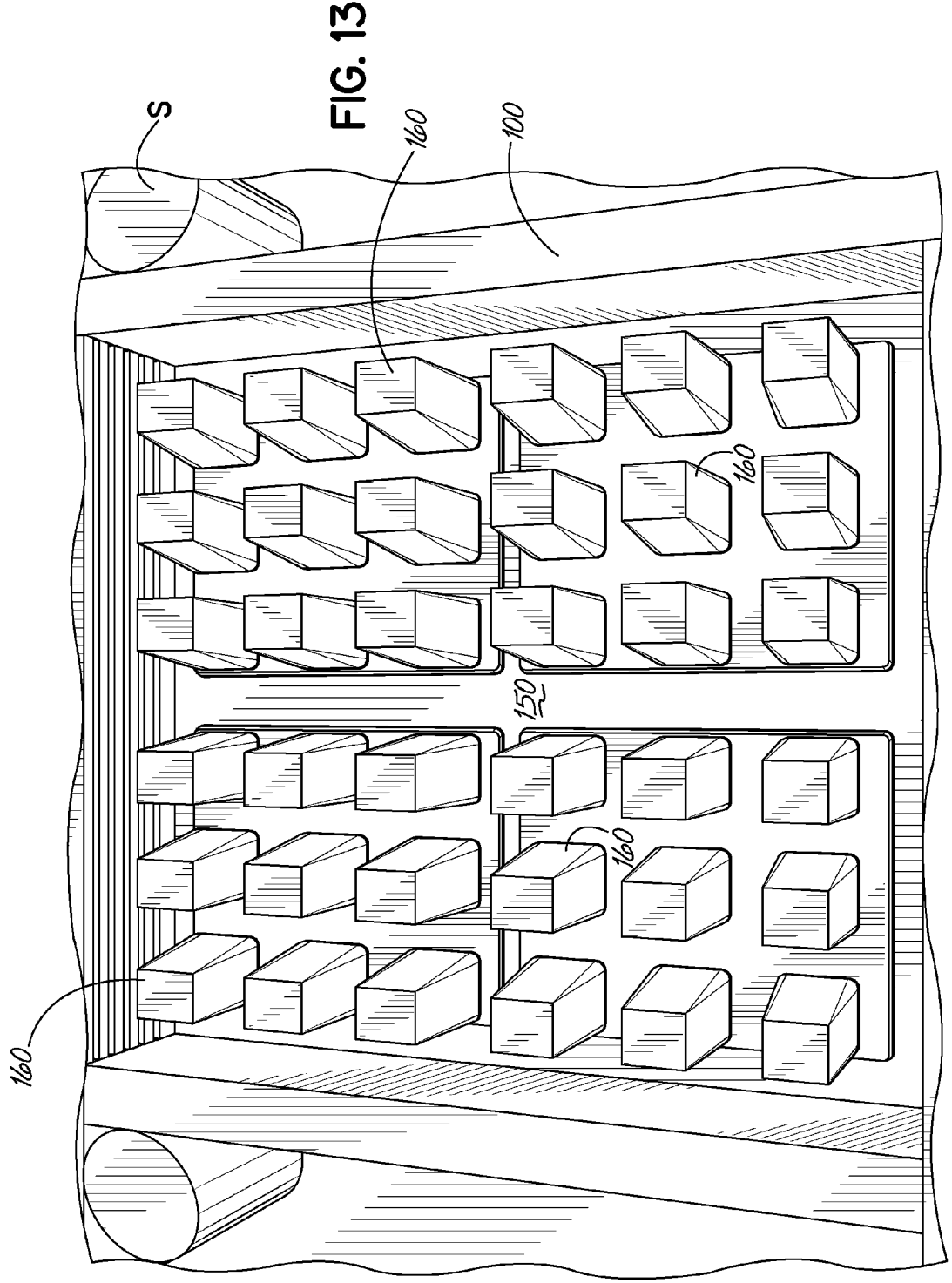
FIG. 13 is a perspective view of a mold for use with an alternate method of producing a mechanical wear element embodiment in the form of a mechanical screen made in accordance with the present disclosure.
Figure 17:
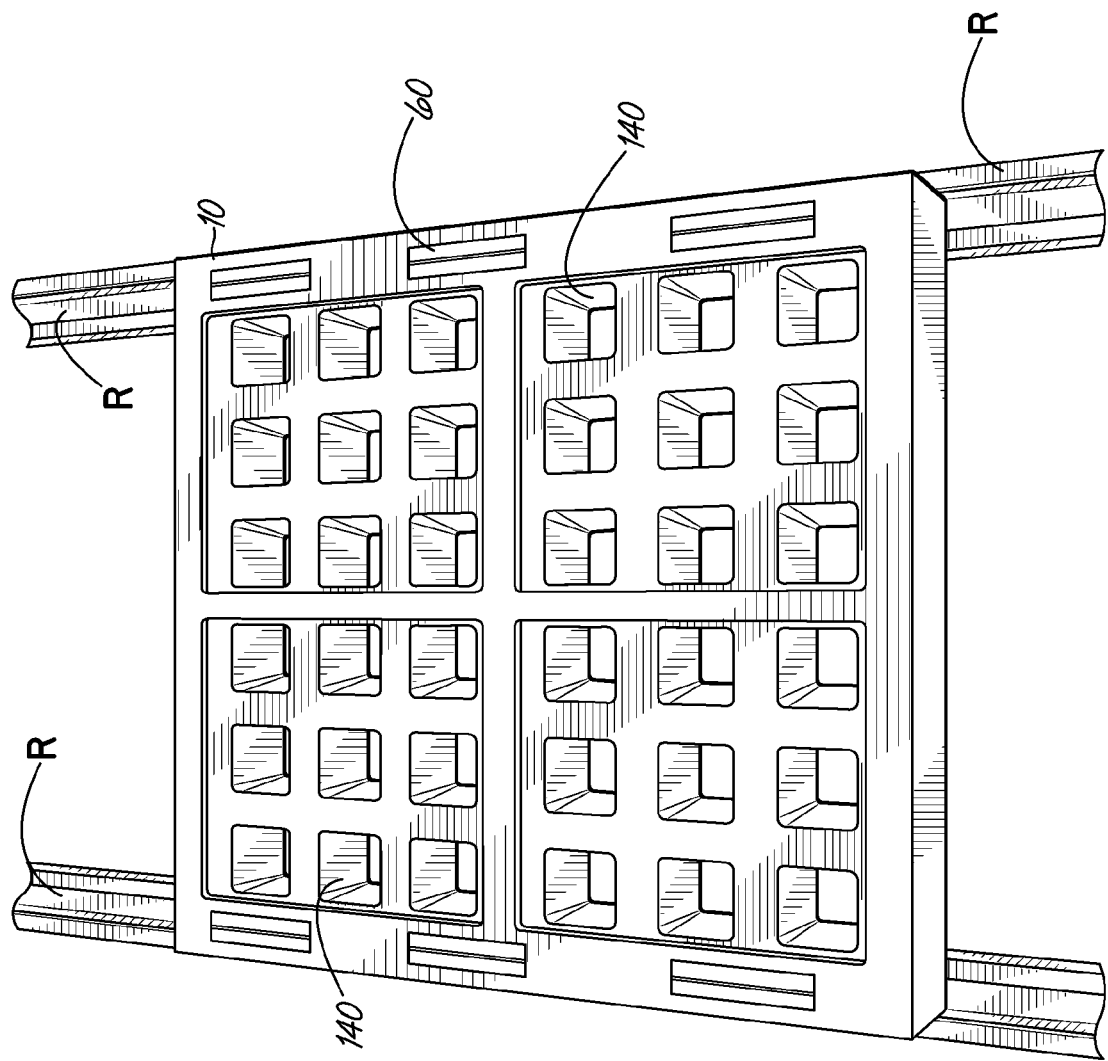
FIG. 17 is a bottom perspective view of a mechanical wear element embodiment in the form of a mechanical screen produced according to FIGS. 13-16, and further showing placement of a plurality of magnetic elements, all in accordance with the present disclosure.

For example, in order to produce a mechanical wear element 10, in one or more of the various forms such as are shown in FIGS. 12 and 17, a molding or casting process may best be utilized, as was described, in part, hereinabove. FIG. 13 shows an alternate form of mold 100 for use in producing a mechanical wear element embodiment in the form of a mechanical screen.

For purposes of creating screen openings, defined by screen opening periphery 140 bounding each such opening, best seen with reference to FIGS. 12 and 17, mold 100 further comprises form or pattern 150. Pattern 150 is produced by any sufficient process, well-known in the molding and casting arts. Through the flow and setting of material around it, pattern 150 defines a portion of the essential geometry of finished mechanical wear element 10. Accordingly, pattern 150 further carries projections 160 that will form those screen openings defined by screen opening periphery 140 bounding each such opening.

Projections 160 are, thusly, configured into geometric form to provide one or more opening of desired shape, size, placement, and configuration following demolding of mechanical wear element 10. In that configuration shown in FIG. 13, projections 160 may be best described as truncated pyramidal forms, or, perhaps, as truncated polyhedron forms, although it will be recognized that pattern 150 may be configured so as to yield mechanical wear element 10 comprising screening openings of any form, nature, size, placement, and configuration. Exemplary forms of openings may include, but are not limited to, slotted patterns, square and/or rectangular patterns, diamond-shaped patterns, circular patterns, or the like, without limitation. It will be recognized that surfaces of pattern 150 may taper, as is known in the art, in order to aid material flow, finished part structural integrity, and the like, and to aid in demolding operations.

Figure 14:
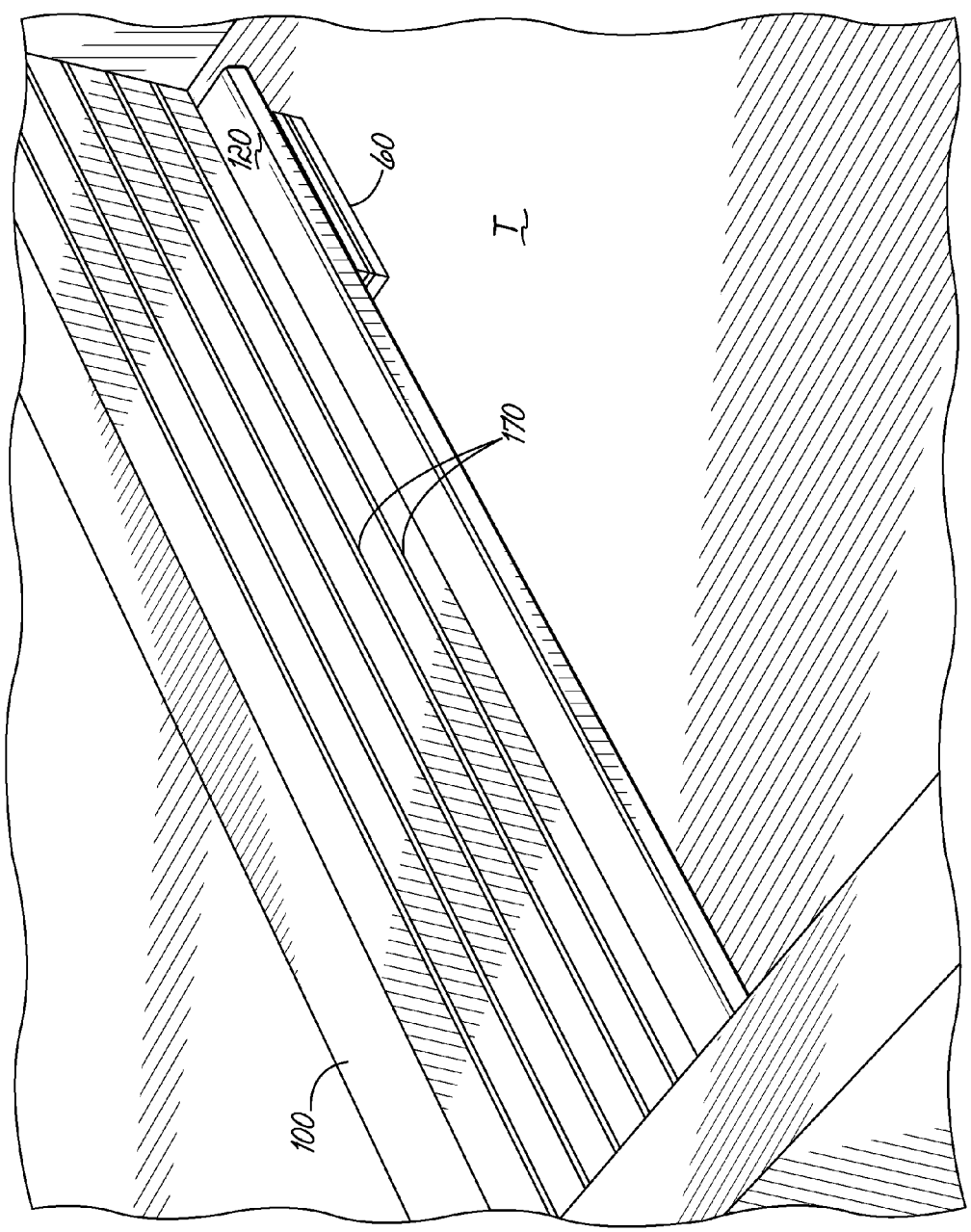
FIG. 14 is a perspective view of a mold for use with an alternate method of producing a mechanical wear element embodiment in the form of a mechanical screen, and further showing placement of a magnetic element, in accordance with the present disclosure.
Figure 15:
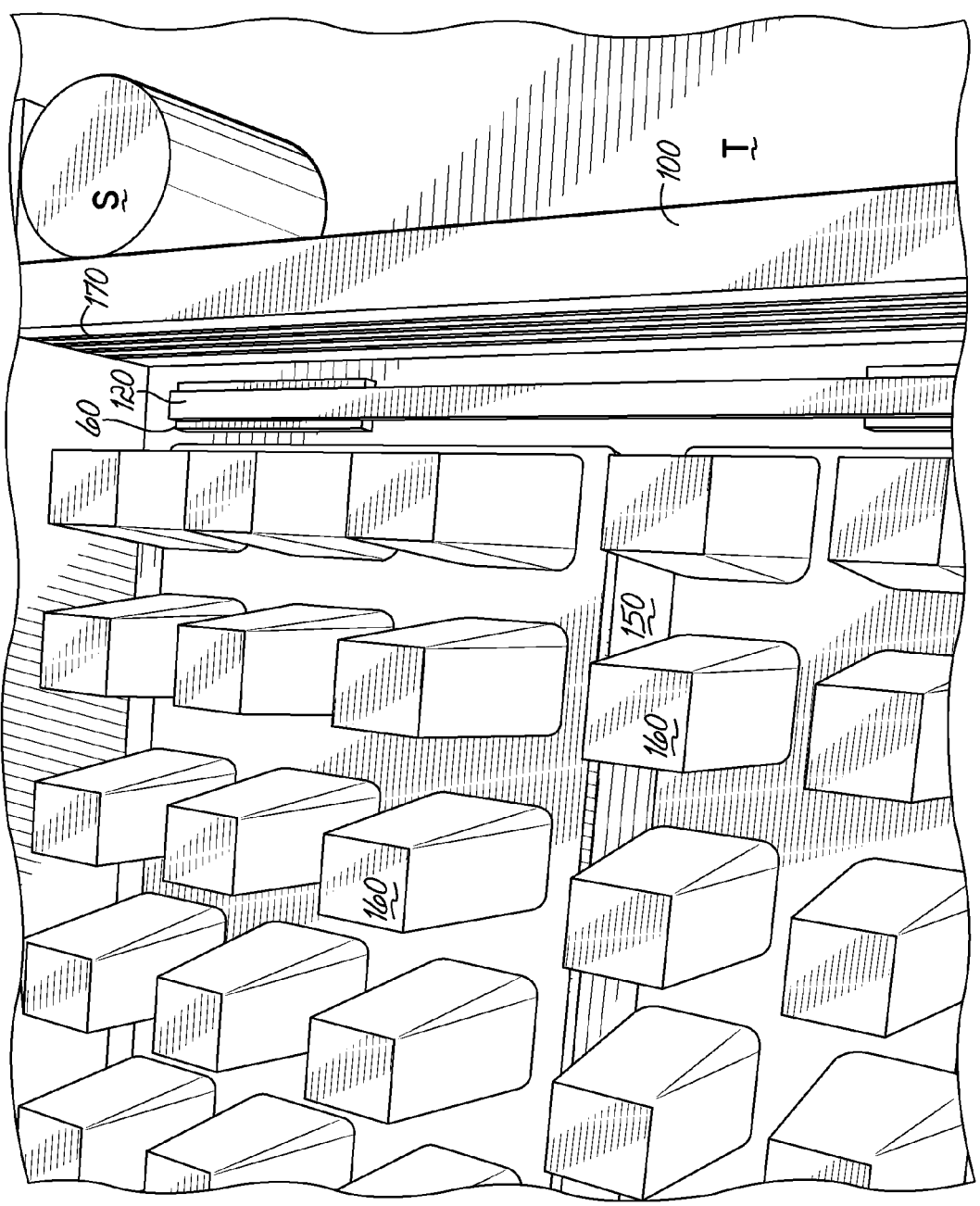
FIG. 15 is a perspective view of a mold for use with an alternate method of producing a mechanical wear element embodiment in the form of a mechanical screen, and further showing placement of a magnetic element adjacent a mold pattern, in accordance with the present disclosure.

Turning now to FIGS. 14 and 15, wherein may be seen certain additional details of an initial set-up of mold 100 for forming mechanical wear element 10 as embodied in FIG. 17. Mold 100, or a plurality of constituent portions thereof, is placed upon a molding surface, preferably a heated molding table T. Mold 100 is configured into shape and size to define a desired outer periphery of finished mechanical wear element 10, and may be constrained into position by one or more stop S engaged upon table T. Mold 100 may carry peripheral wall features 170 in order to introduce features about the periphery of mechanical wear element 10, such as may be utilized to facilitate, for example, handling, interfacing, demolding, and/or engagement of the finished part. At one or more suitable positions adjacent one or more wall of mold 100 are placed one or more magnetic element 60. As was described hereinabove, ferrous band 120 (also considered a magnetic element for purposes of this disclosure) may be placed in cooperative engagement with one or more of magnetic element 60 for the purposes previously described.

Figure 16:
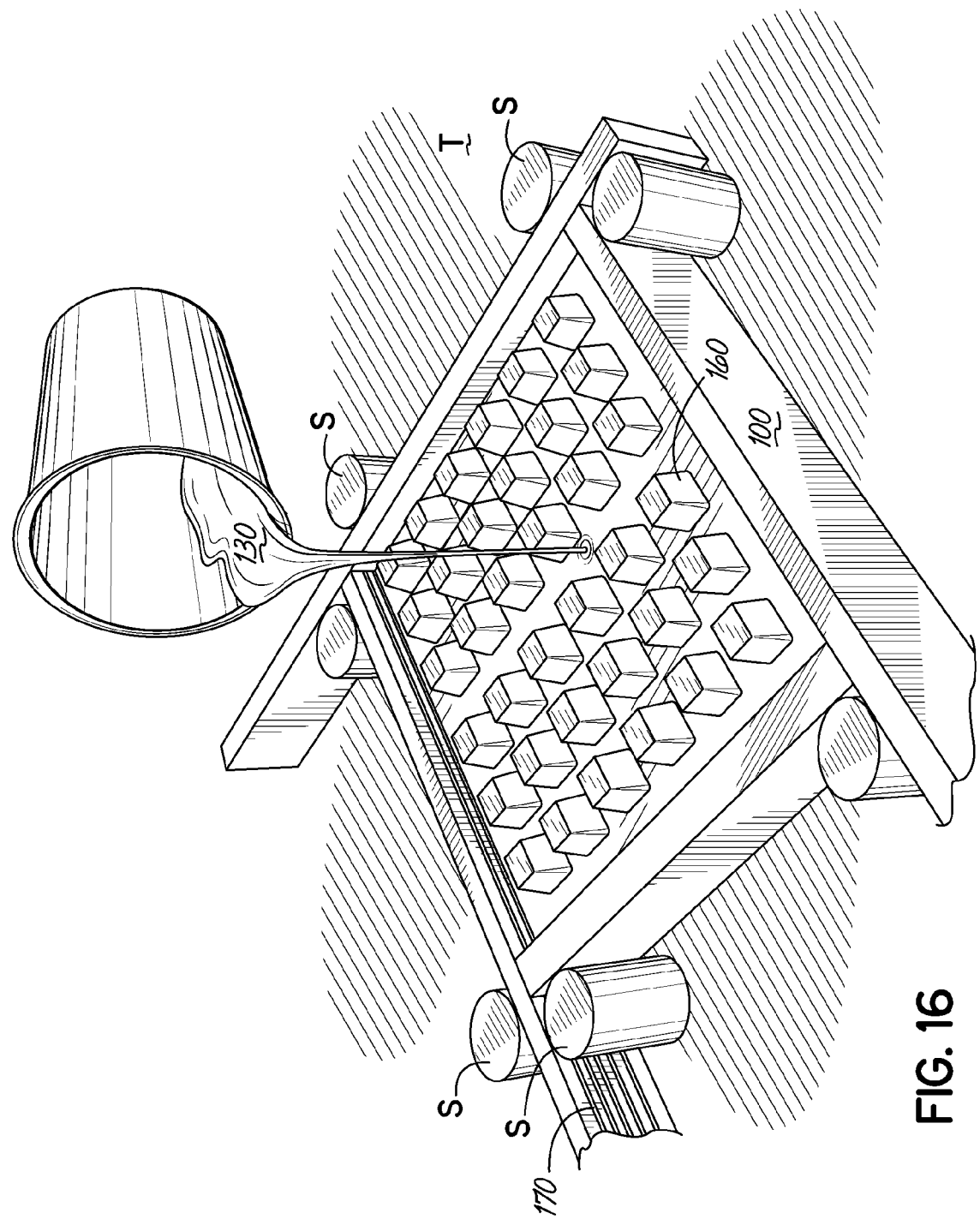
FIG. 16 is a perspective view of a further step in producing a mechanical wear element embodiment in the form of a mechanical screen, made in accordance with the present disclosure.

Best seen with reference to FIG. 15, adjacent ferrous band 120 is placed pattern 150 carrying projections 160. Once mold 100 is suitably configured with pattern 150 and magnetic elements 60, 120, liquid (emulsified) polyurethane material 130, of user selected formulation sufficient for the intended application, is poured or injected into mold 100, as may be seen in FIG. 16. When mold 100 is filled to sufficient depth, the loaded mold is set aside to cure. Curing may occur according to any known process effective for the polyurethane material utilized, whether in elevated temperature environs, or otherwise. When the polyurethane material is sufficiently cured, mechanical wear element 10 is demolded and is thereafter available for an intended use.

FIG. 17 depicts a bottom perspective view of mechanical wear element 10 in the form of a mechanical screen produced in accord with FIGS. 13-16, and further showing placement of a plurality of magnetic elements 60, all in accordance with the above disclosure. In this view may be seen further details of preferred geometry and features provided by pattern 150. It should also be noted that, in this embodiment, mesh material 110 has been omitted, such as may be the case wherein mesh material 110 is not required to meet the intended application.

FIG. 17 further depicts mechanical wear element 10 resting upon a plurality of rails R, rails R being configured in position upon a deck of a screening machine. It may be seen and envisioned that when mechanical wear element 10 is lifted and inverted from the position shown, magnetic elements 60, 120 will be disposed in a designated location for cooperative engagement with one or more sections of rails R. When so positioned for use, mechanical wear element 10 takes that form necessary to operate as a mechanical screen for purposes described hereinabove.

Accordingly, it may be seen that position, width, spacing, number, and other design characteristics of magnetic elements 60, 120 molded within mechanical wear element 10 may be adjusted and/or configured during the molding process in order to best effectuate form, fit, and function of mechanical wear element 10 when placed in position upon a deck of a screening machine. Furthermore, it will be noted that a plurality of mechanical wear elements 10 may be aligned and affixed adjacent one another upon the rails R of screening machine deck, whereupon the screening machine is more fully configured for field use. Similarly, it will be noted that removal, relocation, or the like, of one or more mechanical wear element 10 may be accomplished easily through merely lifting or gently prying mechanical wear element 10 from the associated rails R.

In lieu of positioning mechanical wear element 10 directly upon one or more rails R of a screening machine deck, as was described above with regard to FIG. 17, a form of mechanical wear element 10 called a knock-in bar may sometimes be used. A knock-in bar, according to its intended use, is a device, typically molded or cast from polyurethane material such as is used to form a mechanical screen of the present invention, and according to similar molding processes, forming an interface between rails R and a mechanical wear element 10 used as a screen. A knock-in bar may prevent debris from falling into and between rails R, such as when rails R are formed in a channel-like configuration, may provide an additional wear surface for the screening deck, and may provide a more uniform and a broader surface upon which a mechanical screen may be mounted. Thus, such a knock-in bar is formed with a portion, often described as a wedge-like portion, that may be designed to provide an interference fit within a channel of a rail R and, thus, must be "knocked-in" to its position. In such configuration, the knock-in bar may be firmly affixed to a rail R on a deck of a screening machine, and forms a convenient interface for use with a screen formed in accordance with the present invention.

Figure 18:
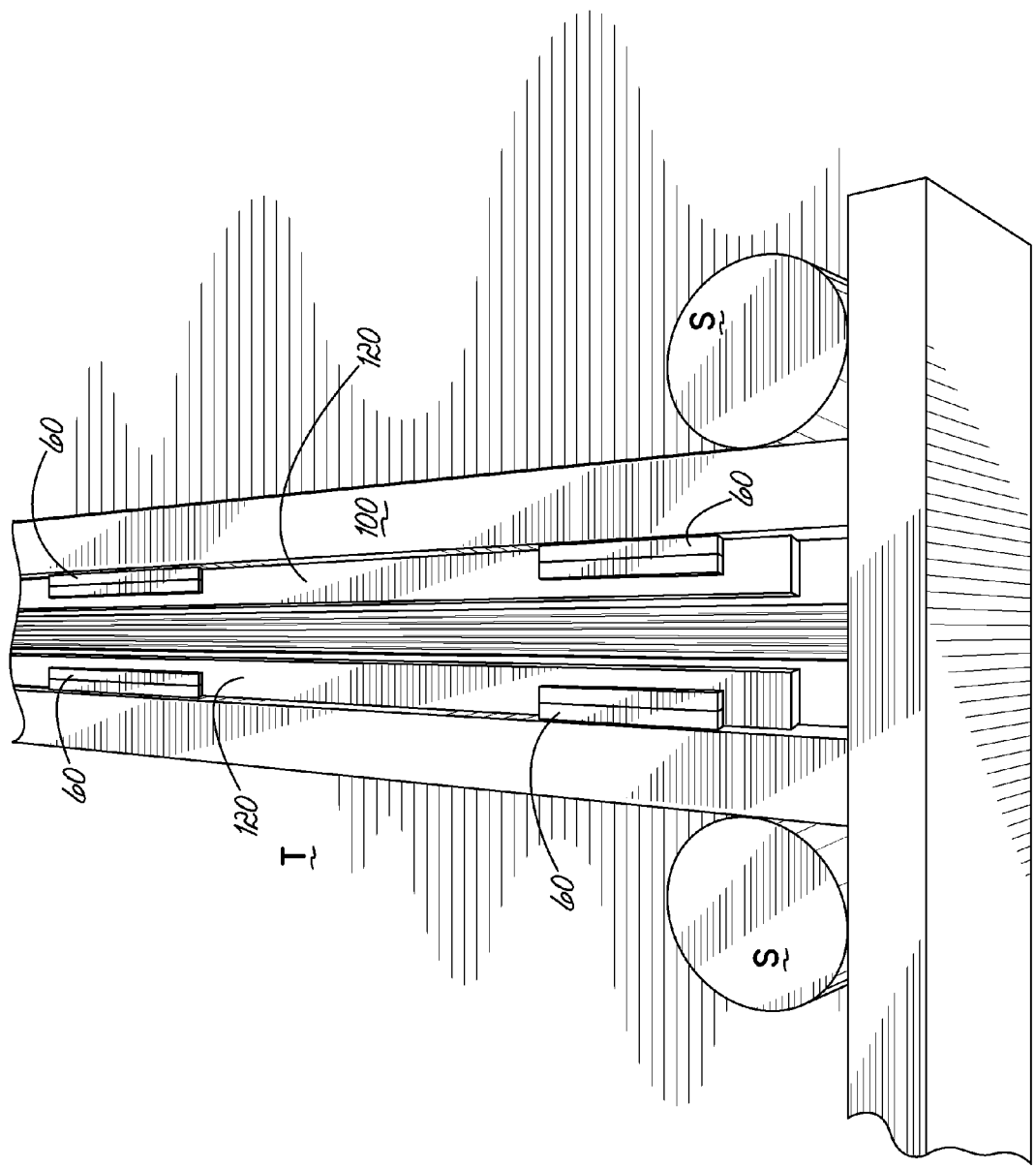
FIG. 18 is a perspective view of a mold for use with an alternate method of producing a mechanical wear element embodiment in the form of a knock-in bar, made in accordance with the present disclosure.

For example, FIG. 18 provides a perspective view of an alternate form of mold 100, configured for use in producing a mechanical wear element 10 in the form of a knock-in bar. Mold 100, or a plurality of constituent portions thereof, is placed upon a molding surface, preferably a heated molding table T. Mold 100 is configured into shape and size to define a desired outer periphery of finished mechanical wear element 10 in the form of a knock-in bar, and may be constrained into position by one or more stop S engaged upon table T. Mold 100 may carry surfaces in order to introduce features about the periphery of mechanical wear element 10, such as may be utilized to facilitate, for example, interfacing of the finished part with a rail R of a deck of a screening machine. At one or more suitable positions adjacent one or more wall of mold 100 are placed one or more magnetic element 60. As was described hereinabove, ferrous band 120 (also considered a magnetic element for purposes of this disclosure) may be placed in cooperative engagement with one or more of magnetic element 60 for the purposes previously described.

Figure 19:
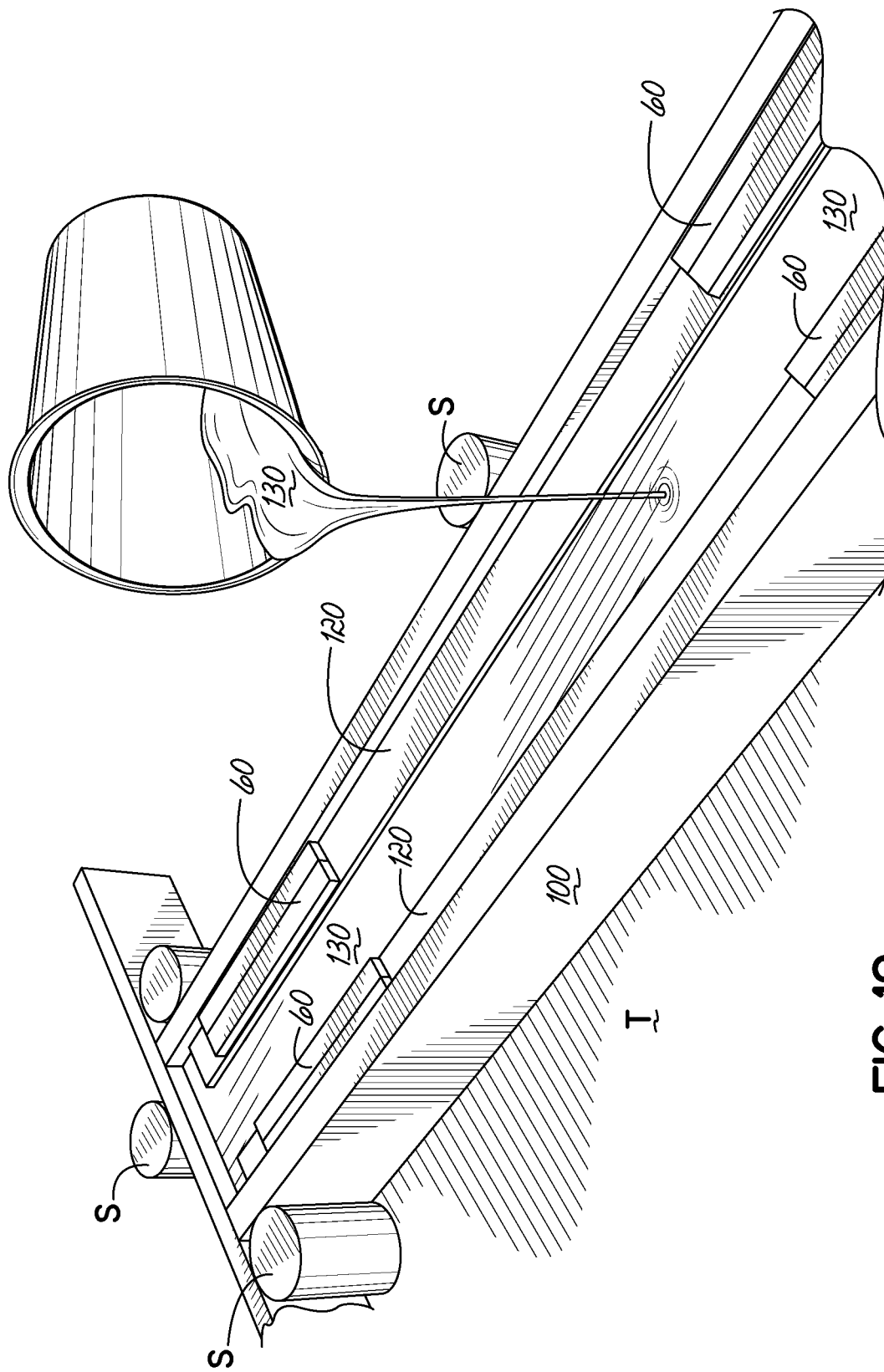
FIG. 19 is a perspective view of a further step in producing a mechanical wear element embodiment in the form of a knock-in bar, made in accordance with the present disclosure.

Best seen with reference to FIG. 19, once mold 100 is suitably configured magnetic elements 60, 120, liquid (emulsified) polyurethane material 130, of user selected formulation sufficient for the intended application, is poured or injected into mold 100. When mold 100 is filled to sufficient depth, the loaded mold is set aside to cure. Curing may occur according to any known process effective for the polyurethane material utilized, whether in elevated temperature environs, or otherwise. When the polyurethane material is sufficiently cured, mechanical wear element 10 in the form of a knock-in bar is demolded and is thereafter available for an intended use.

Figure 20:
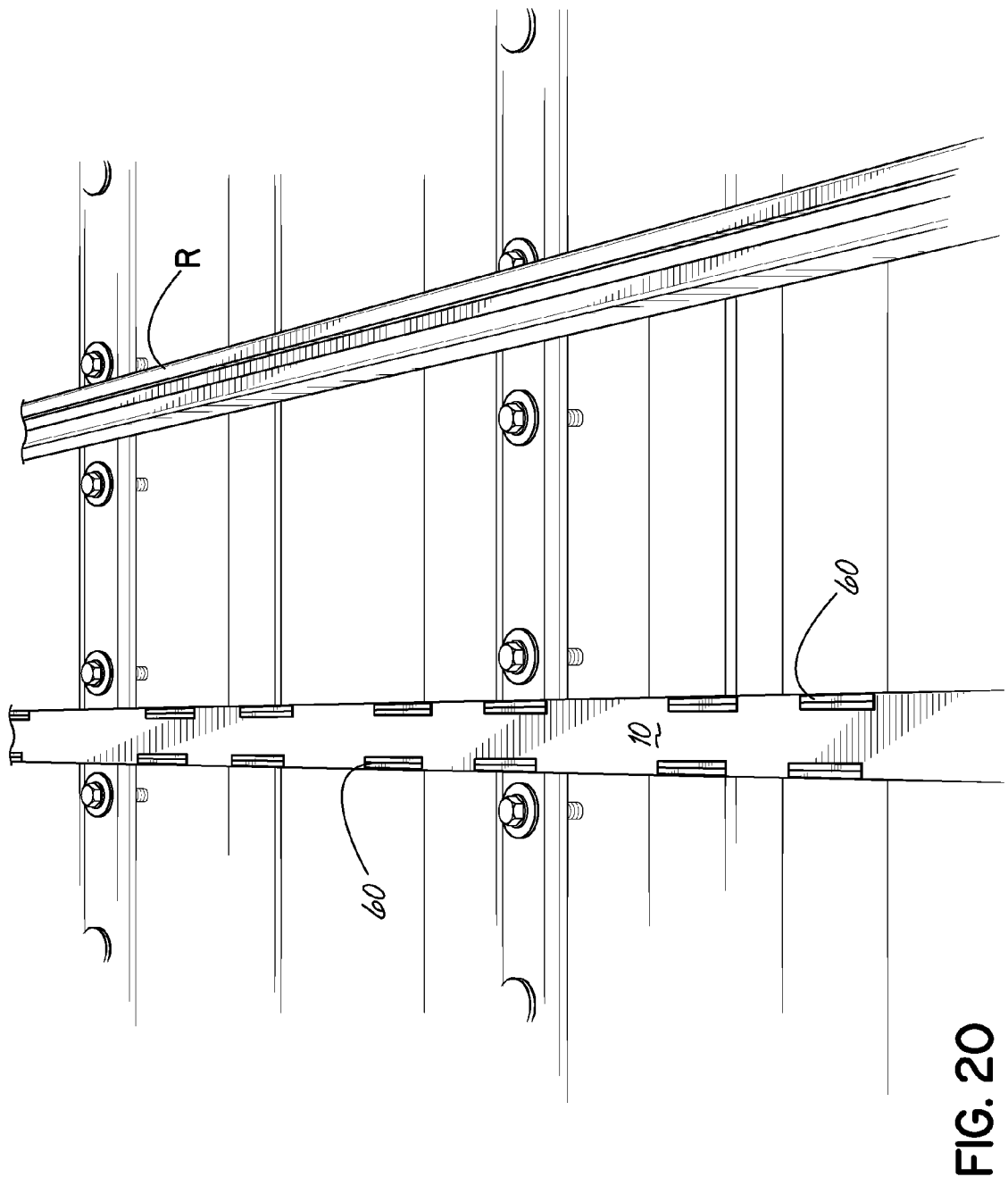
FIG. 20 is a perspective view of a mechanical wear element embodiment in the form of a knock-in bar produced according to FIGS. 18-19, and further showing placement of a plurality of magnetic elements, all in accordance with the present disclosure.

FIG. 20 is a perspective view of a mechanical wear element 10 in the form of a knock-in bar produced according to FIGS. 18-19, and further showing placement of a plurality of magnetic elements 60, all in accordance with the present disclosure. In this view may be seen further details of preferred geometry and features provided by mold 100. It should also be noted that, in this embodiment, mesh material 110 has been omitted, such as may be the case wherein mesh material 110 is not required to meet the intended application.

Figure 21:
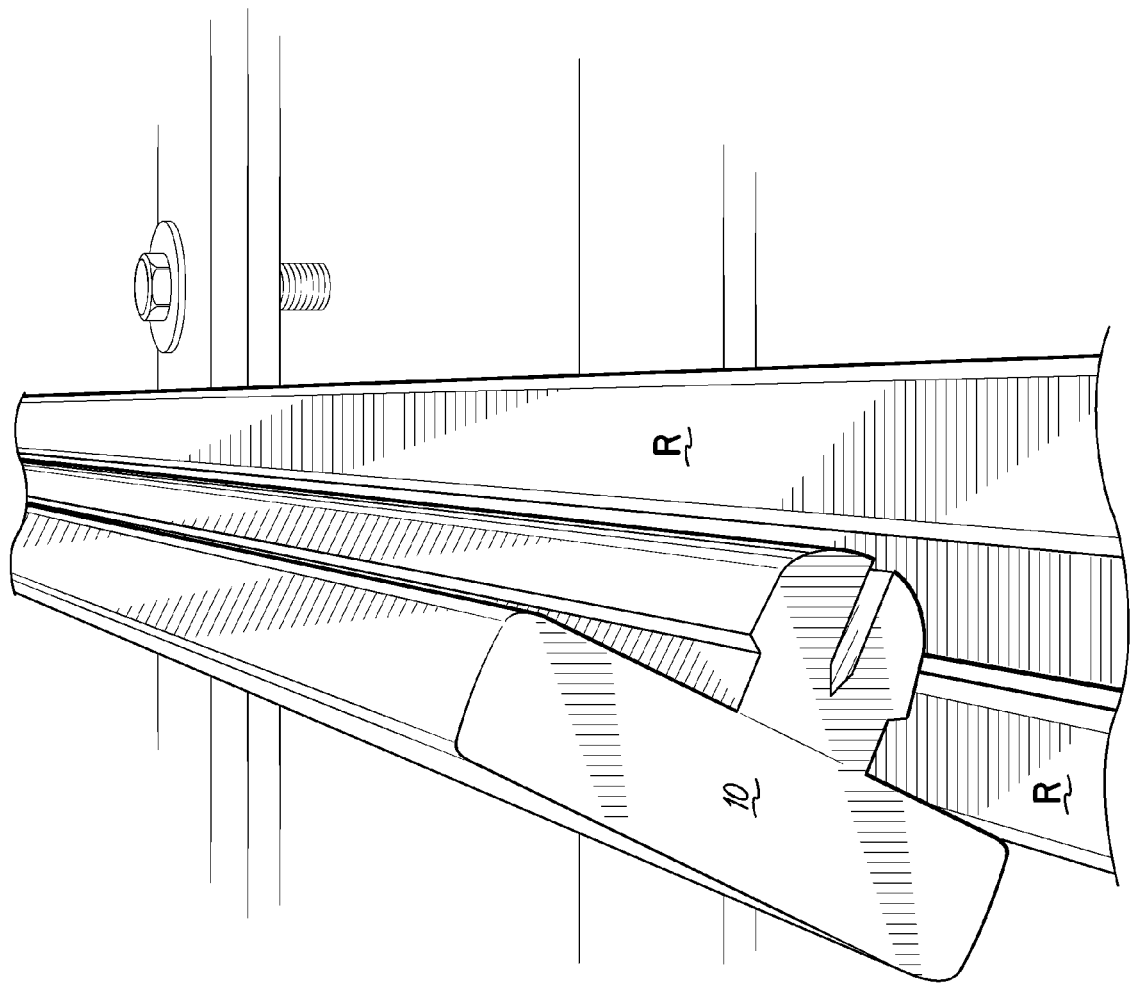
FIG. 21 is a perspective end view of a mechanical wear element embodiment in the form of a knock-in bar of FIG. 20, further showing placement of the knock-in bar in a rail of a screening machine deck.

FIG. 20 further depicts mechanical wear element 10 in the form of a knock-in bar resting upon a plurality of rails R, rails R being configured in position upon a deck of a screening machine. In order to better envision an appropriate interface configuration, FIG. 21 provides a perspective end view of a mechanical wear element 10 in the form of a knock-in bar of FIG. 20, further showing placement of the knock-in bar within a rail of a screening machine deck. It may be seen and envisioned that when mechanical wear element 10 in the form of a knock-in bar is pressed or "knocked-in" to position within a channel of rails R, such as may be seen with reference to FIG. 21, magnetic elements 60, 120 will be disposed in a designated location for cooperative engagement with one or more sections of mechanical wear element 10 in the form of a mechanical screen made in accordance with the disclosure of the present invention.

Accordingly, it may be seen that position, width, spacing, number, and other design characteristics of magnetic elements 60, 120 molded within mechanical wear elements 10, both in the form of a mechanical screen and in the form of a knock-in bar, may be adjusted and/or configured during the molding process in order to best effectuate form, fit, and function of any respective mechanical wear element 10 when placed in cooperating position and engagement upon a deck of a screening machine. Again, it will be noted that a plurality of mechanical wear elements 10, both in the form of a mechanical screen and in the form of a knock-in bar, may be aligned and affixed adjacent one another upon the rails R of screening machine deck, whereupon the screening machine is more fully configured for field use. Similarly, it will be noted that removal, relocation, or the like, of one or more mechanical wear element 10 in the form of a mechanical screen may be accomplished easily through merely lifting or gently prying mechanical wear element 10 in the form of a screen from the associated mechanical wear element 10 in the form of a knock-in bar positioned within rails R. In this manner, as screens are worn or damaged through use, they may be repeatedly removed and replaced without requiring replacement of the associated knock-in bar.

Commensurate with the totality of disclosure made herein, those of ordinary skill in the art will recognize that the above-described mechanical wear element 10 in the form of a knock-in bar, as previously described, may, in an alternative embodiment, comprise a flat bar constructed and manufactured as described hereinabove with regard to FIGS. 18-21, but omitting the knock-in, wedge-like portion. Such an alternative embodiment may be constructed as a relatively flat, bar-like portion comprising magnetic elements 60, 120, as otherwise previously described, to rest upon and be either magnetically or mechanically affixed (for example, via magnets, bolts and nuts, screws, welding, bonding, bracketing, clamping, or the like, without limitation) to one or more rail R, but dispensing with the necessity of needing to be affirmatively knocked-in to rail R as was described above. Such an alternative embodiment will be seen to provide the beneficial characteristics of a knock-in bar, interfacing with rail R surface and with associated screen(s) configured as described above, but without the necessity of such further frictional engagement within rail R required through use of a wedge-like portion.

It has been heretofore noted that some configurations of mechanical wear element 10 may benefit from use of a reinforcing mesh material 110. This is especially true with regard to those forms of mechanical wear element 10 wherein a magnetic element 60 may be disposed within a relatively thin-walled section of mechanical wear element 10. In lieu of use of reinforcing mesh material 110, but in order to provide sufficient structural integrity, and to prevent a magnetic element 60 from being dislodged from its mechanical wear element 10 during use, an alternative embodiment of ferrous strap 120 (also considered a magnetic element for purposes of this disclosure) may be formed and utilized in association with selected ones of magnetic element 60.

Figure 22:
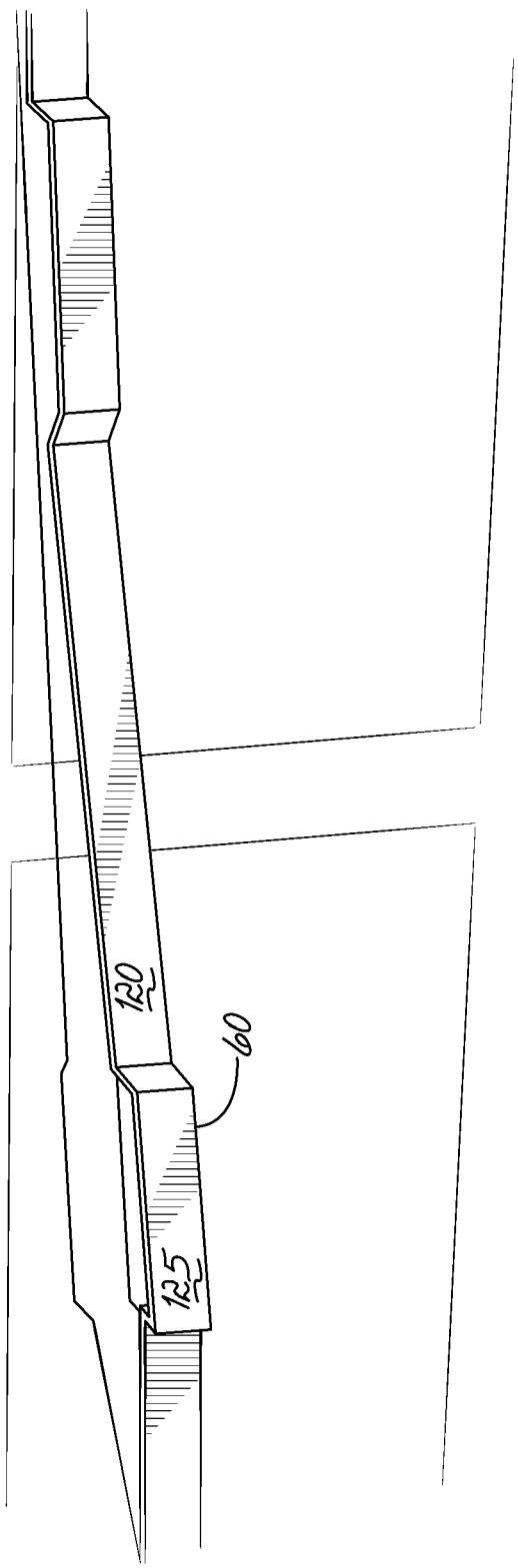
FIG. 22 is a top perspective view of a reinforcing magnetic element that may be utilized in association with one or more other magnetic elements in forming a mechanical wear element embodiment in accordance with the present disclosure.

For example, in FIG. 22 is shown a top perspective view of a reinforcing strap 120 that may be utilized in association with one or more magnetic elements 60 in forming a mechanical wear element 10 in accordance with the present disclosure. Strap 120 is preferably formed from 12-16 gauge steel material, within which may be formed with one or more bend 125 to accommodate one or more magnetic element 60 within each bend 125. In this form, strap 120 will underlie selected ones of magnetic element 60, bridging weaker areas of mechanical wear element 10, and preventing dislocation and/or dislodging of magnetic element 60 from mechanical wear element 10. It will, of course, be recognized that bend 125 may take the form of a relief, a capturing means, or any other configuration sufficient for the purposes herein described.

It should be noted that the particular embodiments, and configurations thereof, hereinabove presented are to be considered merely illustrative. It should be appreciated that numerous changes and modifications may be made without departing from the scope or spirit of the inventions defined herein.

For example, although two specific material choices have been described hereinabove for use with mechanical wear element 10, namely, UHMWPE and polyurethane, it will be recognized that any material conducive to use, formation, and manufacture in accordance with the subject matter disclosure provided herein may be used. Such materials may comprise, in appropriate applications, alternative polyurethane formulations, such as, but not limited to, polyurethane rubbers; natural and/or synthetic rubbers, and alternative formulations thereof; cloth or cloth-like products; metallic meshes and weaves; steel; stainless steel; brass; and/or the like. All such materials are intended to be covered within this disclosure as though fully named and described herein.

Yet additionally, although various preferred manufacturing processes have been described hereinabove, mechanical wear element 10 may be fabricated, manufactured, or otherwise formed through any known process or processes, without limitation. Mechanical wear element 10 may be formed in flat, curved, curvilinear, or any other known geometric form useful for the intended purposes set forth hereinabove.

Similarly, mechanical wear element 10 may comprise screening openings of any form and nature. Exemplary forms of openings may include, but are not limited to, slotted patterns, square and/or rectangular patterns, diamond-shaped patterns, circular patterns, tapered patterns, frusto-geometrical patterns, and the like, and combinations thereof, without limitation.

Additionally, the attachment strength (magnetic field strength) of mechanical wear element 10 to an interfacing structure or element may be adjusted through the use of differing numbers of magnetic elements 60, differing sizes and/or configurations of magnetic elements 60, differing placement and/or orientation of magnetic elements 60, and/or providing magnetic elements 60 of differing magnetic field strengths.

Mechanical wear element 10, thus produced as described hereinabove, or through equivalents within the scope and spirit of the disclosure hereof, are seen to provide certain useful characteristics, including: configuration of mechanical wear element 10 such that magnetic element 60 is not easily removed or dislodged from mechanical wear element 10, regardless of mechanical wear element material choice; provision of mechanical wear element 10 that is easy to install and easy to remove; provision of mechanical wear element 10 that protects the underlying substrate, rather than requiring deleterious modification of the substrate for attachment of the mechanical wear element; provision of mechanical wear element 10 that is less prone to excessive wear and tear; provision of mechanical wear element 10 that is less prone to stress cracks; provision of mechanical wear element 10 that is not easily unintentionally dislodged from desired use, and not easily degraded by scuffing, scratching, weathering, and/or other deleterious effects over time, to name but a few.

It will therefore be understood that the particular embodiment of the subject matter here presented is by way of illustration only, and is, in no way, meant to be restrictive; therefore, numerous changes and modifications may be made, and the full use of equivalents resorted to, without departing from the spirit or scope of the subject matter as provided in the appended claims.

What is claimed:

1. A mechanical wear element for attachment to one of a ferrous or a magnetic substrate comprising:
   a. a mechanical wear element material consisting essentially of non-ferrous material;
   b. a plurality of grooves formed within said mechanical wear element material;
   c. a plurality of magnets each firmly disposed within one of said grooves; and
   d. a ferrous element distinct from the ferrous or magnetic substrate and in contact with at least two of the magnets and embedded within the mechanical wear element material;
   whereby the mechanical wear element is movable and may be attached to one of the ferrous or the magnetic substrate and easily repositioned or removed by a user through lifting or prying the mechanical wear element away from the substrate material which is fixed relative to the mechanical wear element.

2. The mechanical wear element of claim 1, wherein said mechanical wear element material comprises ultra-high molecular weight polyethylene.

3. The mechanical wear element of claim 1, wherein said mechanical wear element material comprises polyurethane.

4. The mechanical wear element of claim 1, wherein said plurality of grooves each comprises a slot.

5. The mechanical wear element of claim 1, wherein a shape of each of said plurality of grooves is selected from the group consisting of a T-shaped groove, a dovetail-shaped groove, and a rectangular-shaped groove.

6. The mechanical wear element of claim 1, wherein each of said grooves is less than a thickness of said mechanical wear element material.

7. The mechanical wear element of claim 1, wherein said mechanical wear element material comprises a sheet of material.

8. The mechanical wear element of claim 1, wherein selected ones of said plurality of magnets each comprises a mechanical wear element engaging portion selected from the group consisting of a T-shaped portion, a dovetail-shaped portion, and a rectangular-shaped portion.

9. The mechanical wear element of claim 1, wherein selected ones of said magnets each comprise a sheet like magnet.

10. A mechanical wear element for attachment to one of a ferrous or a magnetic substrate comprising:
    a. a mechanical wear element material having an exterior face confronting the ferrous or the magnetic substrate when the mechanical wear element is attached thereto;
    b. a plurality of magnets each firmly disposed within said mechanical wear element material; and
    c. a ferrous element distinct from the ferrous or magnetic substrate and in contact with at least two of the magnets and firmly disposed within said mechanical wear element material;
    wherein the ferrous element is embedded within said mechanical wear element material such that substantially none of the ferrous element is exposed on the exterior face of the mechanical wear element;
    whereby the mechanical wear element is movable and when attached to one of the ferrous or the magnetic substrate easily repositioned or removed from the substrate which is fixed relative to the mechanical wear element.

11. The mechanical wear element of claim 10, wherein said mechanical wear element material comprises polyurethane.

12. The mechanical wear element of claim 10 comprising one of a mechanical screen, a bar releasably coupled to a rail of a screening machine and a liner.

13. The mechanical wear element of claim 10 wherein the ferrous element is in contact with more than two of the magnetic elements magnets.

14. The mechanical wear element of claim 10 wherein at least one face of each of the magnets is exposed on an exterior surface of the mechanical wear element material.

15. The mechanical wear element of claim 10 wherein the mechanical wear element material is molded around the plurality of magnets and the ferrous element.

16. The mechanical wear element of claim 10 wherein the mechanical wear element material is non-ferrous.

17. The mechanical wear element of claim 1 wherein the ferrous element is embedded within said mechanical wear element material such that substantially none of the ferrous element is exposed on an exterior face of the mechanical wear element confronting the substrate when the mechanical wear element is attached thereto.

* * * * *

UNITED STATES PATENT AND TRADEMARK OFFICE
CERTIFICATE OF CORRECTION

| | |
|---|---|
| PATENT NO. | : 9,283,700 B2 |
| APPLICATION NO. | : 12/819674 |
| DATED | : March 15, 2016 |
| INVENTOR(S) | : Benjamin Stackpole |

It is certified that error appears in the above-identified patent and that said Letters Patent is hereby corrected as shown below:

In the Claims:

At column 18, claim number 13, line numbers 43-44, "the magnetic elements magnets" should read -- the magnets --.

Signed and Sealed this
Fifth Day of July, 2016

Michelle K. Lee
*Director of the United States Patent and Trademark Office*